United States Patent
Miyamoto et al.

(10) Patent No.: US 10,066,534 B2
(45) Date of Patent: Sep. 4, 2018

(54) INTERNAL COMBUSTION ENGINE

(71) Applicant: Toyota Jidosha Kabushiki Kaisha, Toyota-shi, Aichi-ken (JP)

(72) Inventors: Hiroshi Miyamoto, Susono (JP); Tatsuhiro Hashida, Shizuoka-ken (JP); Takahiko Fujiwara, Shizuoka-ken (JP); Yasushi Iwazaki, Ebina (JP); Toru Kidokoro, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 232 days.

(21) Appl. No.: 15/248,680

(22) Filed: Aug. 26, 2016

(65) Prior Publication Data

US 2017/0058749 A1 Mar. 2, 2017

(30) Foreign Application Priority Data

Aug. 31, 2015 (JP) ................................. 2015-170917

(51) Int. Cl.
*F01N 3/08* (2006.01)
*F01N 11/00* (2006.01)
(Continued)

(52) U.S. Cl.
CPC .......... *F01N 11/007* (2013.01); *F01N 3/0864* (2013.01); *F01N 3/20* (2013.01);
(Continued)

(58) Field of Classification Search
CPC ...... F01N 11/005; F01N 11/007; F01N 13/08; F01N 3/0864; F01N 3/101; F01N 3/20;
(Continued)

(56) References Cited

U.S. PATENT DOCUMENTS

2009/0313974 A1* 12/2009 Iida ........................ F01N 11/007
60/287
2011/0192146 A1* 8/2011 Sugimoto ........... F02D 41/0085
60/276
(Continued)

FOREIGN PATENT DOCUMENTS

| JP | 2004-176612 A | 6/2004 |
| JP | 2009-091921 A | 4/2009 |
| JP | 2010-185371 A | 8/2010 |
| WO | 2013/157048 A1 | 10/2013 |

*Primary Examiner* — Laert Dounis
*Assistant Examiner* — Matthew T Largi
(74) *Attorney, Agent, or Firm* — Dinsmore & Shohl LLP

(57) ABSTRACT

The internal combustion engine comprises an exhaust purification catalyst 20, a downstream side sensor 41, an air-fuel ratio control unit, and an oxygen storage amount calculating unit for calculating the oxygen excess/deficiency of the inflowing exhaust gas in an air-fuel ratio maintenance time period and cumulatively adding the calculated oxygen excess/deficiency to calculate a maximum oxygen storage amount of the exhaust purification catalyst. The oxygen storage amount calculating unit uses a point of time that an absolute value of an output slope of the downstream side sensor finally becomes less than a threshold value in the air-fuel ratio maintenance time period as an end point of cumulative addition of the oxygen excess/deficiency. The threshold value is made larger when a maximum value of the absolute value of the output slope in the air-fuel ratio maintenance time period is relatively large compared to when the maximum value is relatively small.

11 Claims, 17 Drawing Sheets

(51) Int. Cl.
*F01N 3/20* (2006.01)
*F01N 13/08* (2010.01)

(52) U.S. Cl.
CPC ............ *F01N 11/005* (2013.01); *F01N 13/08* (2013.01); *F01N 2390/02* (2013.01); *F01N 2550/02* (2013.01); *F01N 2900/1402* (2013.01); *F01N 2900/1602* (2013.01)

(58) Field of Classification Search
CPC ............ F01N 2390/02; F01N 2550/02; F01N 2900/1402; F01N 2900/1602; F01N 2900/1624; Y02T 10/22; Y02T 10/47
See application file for complete search history.

(56) References Cited

U.S. PATENT DOCUMENTS

| | | | |
|---|---|---|---|
| 2012/0031075 A1* | 2/2012 | Odendall | F01N 11/007 60/274 |
| 2012/0173116 A1* | 7/2012 | Iwazaki | F02D 41/008 701/101 |
| 2013/0253802 A1* | 9/2013 | Miyamoto | F02D 43/04 701/103 |
| 2014/0298889 A1* | 10/2014 | Miyamoto | G01M 15/104 73/23.32 |
| 2015/0192083 A1* | 7/2015 | Suzuki | F02D 41/1454 701/101 |

\* cited by examiner

FIG. 1
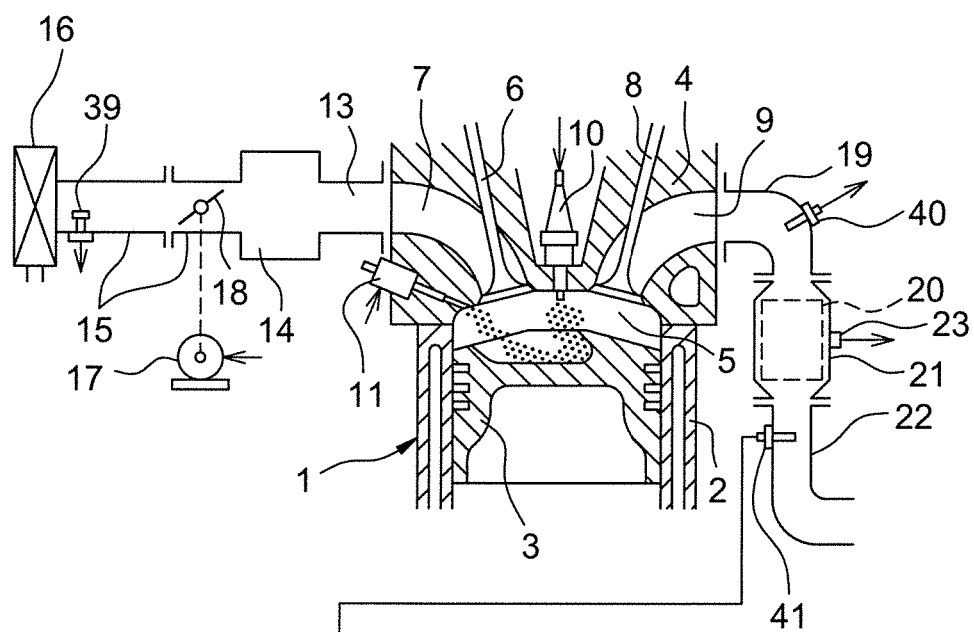
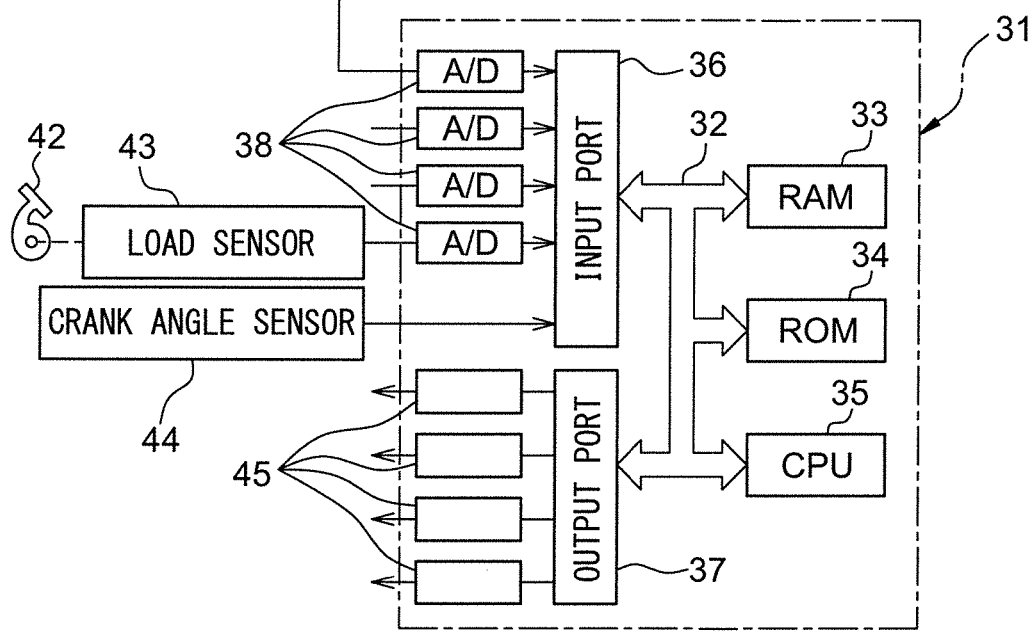

INTERNAL COMBUSTION ENGINE

CROSS-REFERENCE TO RELATED APPLICATIONS

This application claims priority to Japanese Patent Application No. 2015-170917 filed on Aug. 31, 2015, the entire contents of which is hereby incorporated by reference.

TECHNICAL FIELD

The present disclosure relates to an internal combustion engine.

BACKGROUND ART

In the past, in an internal combustion engine, it was known to provide an exhaust passage with an exhaust purification catalyst able to remove harmful substances in exhaust gas. However, the exhaust purification catalyst sometimes deteriorates along with time due to poisoning, heat degradation, etc. If the exhaust purification catalyst deteriorates, the exhaust purification catalyst falls in purification efficiency. For this reason, it is desirable to be able to quickly detect if the exhaust purification catalyst has deteriorated and the exhaust purification catalyst is abnormal. Therefore, in the internal combustion engine described in PLT 1, a downstream side sensor detecting the air-fuel ratio of the exhaust gas flowing out from the exhaust purification catalyst is used to calculate the maximum oxygen storage amount of the exhaust purification catalyst and thereby diagnose the exhaust purification catalyst for abnormality.

In this internal combustion engine, the air-fuel ratio at the upstream side of the catalyst is alternately switched between an air-fuel ratio richer than the stoichiometric air-fuel ratio and an air-fuel ratio leaner than the stoichiometric air-fuel ratio. Each time the air-fuel ratio is switched, the maximum oxygen storage amount of the catalyst is calculated. Specifically, the amount of oxygen stored in the exhaust purification catalyst or released from the exhaust purification catalyst in the time period when the derivative or second derivative of the output of the downstream side sensor is within a predetermined range is calculated and the calculated amount of oxygen is made the estimated value of the maximum oxygen storage amount. If the calculated maximum oxygen storage amount is a predetermined value or less, it is judged that the exhaust purification catalyst is abnormal.

CITATION LIST

Patent Literature

PLT 1. Japanese Patent Publication No. 2010-185371A
PLT 2. Japanese Patent Publication No. 2004-176612A
PLT 3. Japanese Patent Publication No. 2009-091921A

SUMMARY

Technical Problem

However, sometimes the downstream side sensor gradually deteriorates along with use and the response characteristic becomes abnormal. If the response characteristic of the downstream side sensor becomes abnormal, the slope of the output of the downstream side sensor when the air-fuel ratio at the downstream side of the catalyst changes, that is, the derivative of the output of the downstream side sensor, becomes smaller. For this reason, after the air-fuel ratio at the upstream side of the catalyst is switched, the time period during which the derivative or second derivative of the output of the downstream side sensor is in a predetermined range becomes longer. As a result, the maximum oxygen storage amount of the exhaust purification catalyst is calculated larger than it actually is. Therefore, in the abnormality diagnosis method described in PLT 1, if the response characteristic of the downstream side sensor becomes abnormal, even if the exhaust purification catalyst deteriorates, it is liable to be judged that the exhaust purification catalyst is not abnormal.

Therefore, in view of the above problem, an object of the present disclosure is to provide an internal combustion engine able to precisely calculate a maximum oxygen storage amount of an exhaust purification catalyst even if a response characteristic of the downstream side sensor is abnormal.

Solution to Problem

In order to solve the above problem, in a first aspect of the present disclosure, there is provided an internal combustion engine comprising: an exhaust purification catalyst arranged in an exhaust passage and able to store oxygen, a downstream side sensor arranged at a downstream side of the exhaust purification catalyst in a direction of flow of exhaust and detecting an air-fuel ratio of outflowing exhaust gas flowing out from the exhaust purification catalyst, an air-fuel ratio control unit for alternately switching a target air-fuel ratio of inflowing exhaust gas flowing into the exhaust purification catalyst between a rich set air-fuel ratio richer than a stoichiometric air-fuel ratio and a lean set air-fuel ratio leaner than the stoichiometric air-fuel ratio based on an output of the downstream side sensor, and an oxygen storage amount calculating unit for calculating the oxygen excess/deficiency of the inflowing exhaust gas with respect to the stoichiometric air-fuel ratio in a time period of at least part of an air-fuel ratio maintenance time period in which the target air-fuel ratio is maintained at either air-fuel ratio of the rich set air-fuel ratio and the lean set air-fuel ratio and cumulatively adding the calculated oxygen excess/deficiency to calculate a maximum oxygen storage amount of the exhaust purification catalyst, wherein the oxygen storage amount calculating unit uses a point of time that an absolute value of an output slope of the downstream side sensor finally becomes less than a threshold value in the air-fuel ratio maintenance time period as an end point of cumulative addition of the oxygen excess/deficiency, and the threshold value is made larger when a maximum value of the absolute value of the output slope in the air-fuel ratio maintenance time period is relatively large compared to when the maximum value is relatively small.

In a second aspect of the present disclosure, the downstream side sensor is an air-fuel ratio sensor linearly detecting an air-fuel ratio of the outflowing exhaust gas, in the first aspect of the present disclosure.

In a third aspect of the present disclosure, the internal combustion engine further comprises a catalyst temperature estimating unit for estimating a temperature of the exhaust purification catalyst, the oxygen storage amount calculating unit calculates the oxygen excess/deficiency of the inflowing exhaust gas with respect to the stoichiometric air-fuel ratio in a time period of at least part of an air-fuel ratio maintenance time period in which the target air-fuel ratio is maintained at the lean set air-fuel ratio and cumulatively adds the calculated oxygen excess/deficiency to calculate a maximum oxygen storage amount of the exhaust purification catalyst, and the threshold value is corrected based on a temperature of the exhaust purification catalyst in the air-fuel ratio maintenance time period, in the second aspect of the present disclosure.

In a forth aspect of the present disclosure aspect of the present disclosure, the internal combustion engine further comprises an upstream side air-fuel ratio sensor arranged at an upstream side of the exhaust purification catalyst in the direction of flow of exhaust and linearly detecting an air-fuel ratio of the inflowing exhaust gas, and the oxygen storage amount calculating unit calculates the oxygen excess/deficiency based on the output of the upstream side air-fuel ratio sensor, in any one of the first to third aspects of the present disclosure.

In a fifth aspect of the present disclosure, the oxygen storage amount calculating unit uses a time that the air-fuel ratio detected by the upstream side air-fuel ratio sensor in the air-fuel ratio maintenance time period reaches the stoichiometric air-fuel ratio as a starting point of cumulative addition of the oxygen excess/deficiency, in the fourth aspect of the present disclosure.

In a sixth aspect of the present disclosure, the oxygen storage amount calculating unit uses a time that the target air-fuel ratio is switched to either of the air-fuel ratios in the air-fuel ratio maintenance time period as a starting point of cumulative addition of the oxygen excess/deficiency, in any one of the first to fourth aspects of the present disclosure.

In a seventh aspect of the present disclosure, the internal combustion engine further comprises a catalyst abnormality judging unit for judging if the exhaust purification catalyst is abnormal, and the catalyst abnormality judging unit judges that the exhaust purification catalyst is abnormal when the maximum oxygen storage amount is smaller than a predetermined reference oxygen storage amount, in any one of the first to sixth aspects of the present disclosure.

In an eighth aspect of the present disclosure, the internal combustion engine further comprises a sensor abnormality judging unit for judging if the downstream side sensor is abnormal, after the target air-fuel ratio is switched to the lean set air-fuel ratio, the oxygen storage amount calculating unit calculates an oxygen storage amount stored in the exhaust purification catalyst in the period from when the air-fuel ratio detected by the upstream side air-fuel ratio sensor becomes the stoichiometric air-fuel ratio or more to when the air-fuel ratio detected by the downstream side sensor becomes a predetermined air-fuel ratio leaner than the stoichiometric air-fuel ratio or becomes more, and the sensor abnormality judging unit judges that the downstream side sensor is abnormal when a difference between the oxygen storage amount and the maximum oxygen storage amount is larger than a predetermined first reference amount, in the fifth aspect of the present disclosure.

In a ninth aspect of the present disclosure, the internal combustion engine further comprises a sensor abnormality judging unit for judging if the downstream side sensor is abnormal, after the target air-fuel ratio is switched to the rich set air-fuel ratio, the oxygen storage amount calculating unit calculates an oxygen release amount of oxygen released from the exhaust purification catalyst in the period from when the air-fuel ratio detected by the upstream side air-fuel ratio sensor becomes the stoichiometric air-fuel ratio or less to when the air-fuel ratio detected by the downstream side sensor becomes a predetermined air-fuel ratio richer than the stoichiometric air-fuel ratio or becomes less, and the sensor abnormality judging unit judges that the downstream side sensor is abnormal when a difference between the oxygen release amount and the maximum oxygen storage amount is larger than a predetermined first reference amount, in the fifth aspect of the present disclosure.

In a tenth aspect of the present disclosure, the internal combustion engine further comprises a sensor abnormality judging unit for judging if the downstream side sensor is abnormal, the oxygen storage amount calculating unit calculates an oxygen storage amount stored in the exhaust purification catalyst in the period from when the target air-fuel ratio is switched to the lean set air-fuel ratio to when the air-fuel ratio detected by the downstream side air-fuel ratio sensor becomes a predetermined value leaner than the stoichiometric air-fuel ratio or becomes more, and the sensor abnormality judging unit judges that the downstream side sensor is abnormal when a difference between the oxygen storage amount and the maximum oxygen storage amount is larger than a predetermined second reference amount, in the sixth aspect of the present disclosure.

In an eleventh aspect of the present disclosure, the internal combustion engine further comprises a sensor abnormality judging unit for judging if the downstream side sensor is abnormal, the oxygen storage amount calculating unit calculates an oxygen release amount of oxygen released from the exhaust purification catalyst in the period from when the target air-fuel ratio is switched to the rich set air-fuel ratio to when the air-fuel ratio detected by the downstream side air-fuel ratio sensor becomes a predetermined value richer than the stoichiometric air-fuel ratio or becomes less, and the sensor abnormality judging unit judges that the downstream side sensor is abnormal when a difference between the oxygen release amount and the maximum oxygen storage amount is larger than a predetermined second reference amount, in the sixth aspect of the present disclosure.

According to the present disclosure, there is provided an internal combustion engine able to precisely calculate a maximum oxygen storage amount of an exhaust purification catalyst even if a response characteristic of the downstream side sensor is abnormal.

BRIEF DESCRIPTION OF DRAWINGS

FIG. 1 is a schematic view of an internal combustion engine in a first embodiment of the present disclosure.

DESCRIPTION OF EMBODIMENTS

Figure 2A:
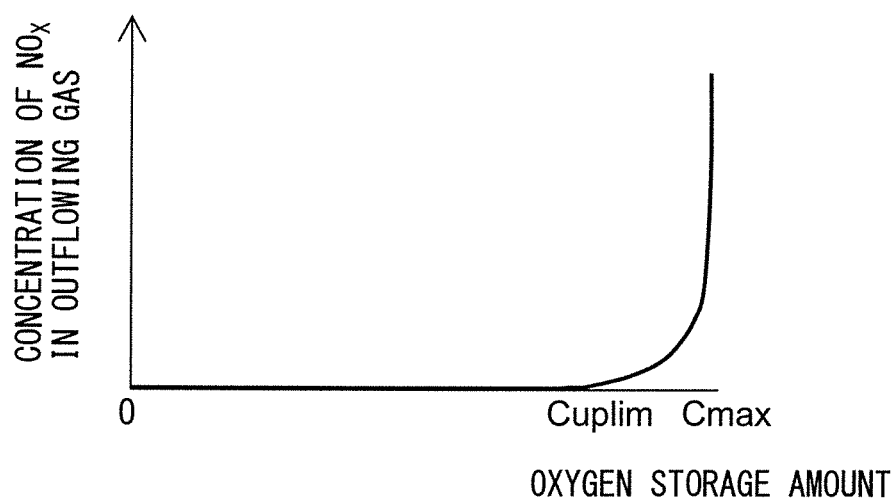
FIG. 2A is a view showing a relationship between an oxygen storage amount of an exhaust purification catalyst and a concentration of $NO_X$.

Referring to the drawings, an embodiment of the present disclosure will be explained in detail below. Note that, in the following explanation, similar component elements are assigned the same reference numerals.

First Embodiment

First, referring to FIG. 1 to FIG. 12, a first embodiment of the present disclosure will be explained.

<Explanation of Internal Combustion Engine as a Whole>

FIG. 1 is a view which schematically shows an internal combustion engine in the first embodiment of the present disclosure. The internal combustion engine in the present embodiment is, for example, carried in a vehicle. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel directly into the combustion chamber 5 in accordance with an injection signal. That is, the internal combustion engine of the present embodiment is a cylinder injection type internal combustion engine. Note that, the internal combustion engine may be a port injection type internal combustion engine, and in this case, the fuel injector 11 is arranged so as to inject fuel inside the intake port 7. Further, in the present embodiment, as the fuel, gasoline with a stoichiometric air-fuel ratio of 14.6 is used. However, the internal combustion engine in the present embodiment may use the other fuel.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an casing 21 which has an exhaust purification catalyst 20 built into it. The casing 21 is connected to an exhaust pipe 22. The exhaust port 9, exhaust manifold 19, casing 21, exhaust pipe 22, etc., form an exhaust passage which discharges exhaust gas produced due to combustion of the air-fuel mixture in the combustion chamber 5.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Accordingly, the air flow meter 39 can detect an amount of the intake air fed to the combustion chamber 5.

Further, at the header of the exhaust manifold 19 (i.e., a upstream side of the exhaust purification catalyst 20 in the direction of flow of exhaust), an upstream side air-fuel ratio sensor 40 is arranged which detects the air-fuel ratio of the exhaust gas which flows through the inside of the exhaust manifold 19 (that is, the exhaust gas which flows into the exhaust purification catalyst 20). In addition, in the exhaust pipe 22 (i.e., a downstream side of the exhaust purification catalyst 20 in the direction of flow of exhaust), a downstream side air-fuel ratio sensor 41 is arranged which detects the air-fuel ratio of the exhaust gas flowing through the inside of the exhaust pipe 22 (that is, the exhaust gas which flows out from the exhaust purification catalyst 20). The outputs of these air-fuel ratio sensors 40 and 41 are also input through the corresponding AD converters 38 to the input port 36. Note that configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a control system for controlling the internal combustion engine.

<Explanation of Exhaust Purification Catalyst>

The exhaust purification catalysts 20 disposed at the exhaust passage is a three-way catalyst which has oxygen storage abilities. Specifically, the exhaust purification catalyst 20 is comprised of a carrier which is comprised of ceramic on which a precious metal which has a catalytic action (for example, platinum (Pt)) and a substance which has an oxygen storage ability (for example, ceria ($CeO_2$)) are carried. The exhaust purification catalyst 20 exhibits a catalytic action of simultaneously removing unburned gas (HC, CO, etc.) and nitrogen oxides ($NO_X$) when reaching a predetermined activation temperature and, in addition, an oxygen storage ability.

According to the oxygen storage ability of the exhaust purification catalyst 20, the exhaust purification catalyst 20 stores the oxygen in the exhaust gas when the air-fuel ratio of the exhaust gas which flows into the exhaust purification catalyst 20 is leaner than the stoichiometric air-fuel ratio (lean air-fuel ratio). On the other hand, the exhaust purification catalyst 20 releases the oxygen which is stored in the exhaust purification catalyst 20 when the inflowing exhaust gas has an air-fuel ratio which is richer than the stoichiometric air-fuel ratio (rich air-fuel ratio).

The exhaust purification catalyst 20 has a catalytic action and oxygen storage ability and thereby have the action of removing $NO_X$ and unburned gas according to the stored amount of oxygen. That is, as shown in FIG. 2A, if the air-fuel ratio of the exhaust gas which flows into the exhaust purification catalyst 20 is a lean air-fuel ratio, when the stored amount of oxygen is small, the exhaust purification catalyst 20 stores the oxygen in the exhaust gas. Further, along with this, the $NO_X$ in the exhaust gas is removed by reduction. Further, if the stored amount of oxygen becomes larger, the exhaust gas which flows out from the exhaust purification catalyst 20 rapidly rises in concentration of oxygen and $NO_X$ at a certain stored amount near the maximum oxygen storage amount Cmax (in the figure, Cuplim).

Figure 2B:
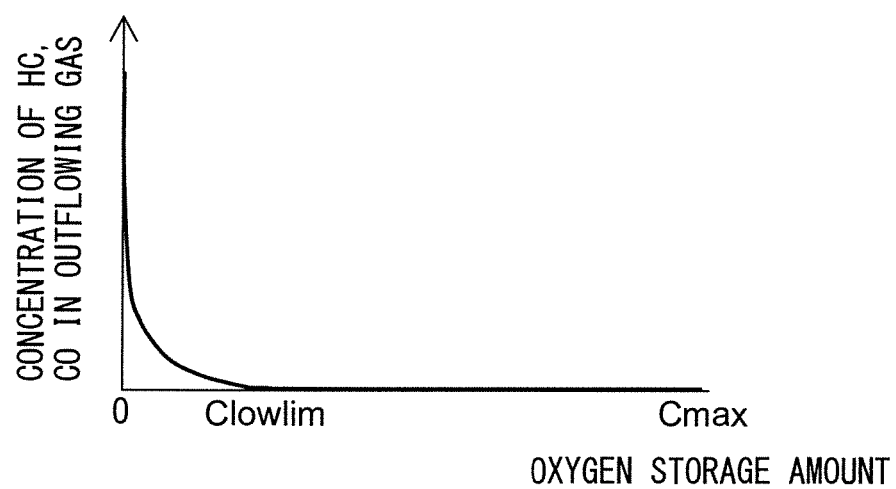
FIG. 2B is a view showing a relationship between an oxygen storage amount of an exhaust purification catalyst and a concentration of HC, CO in exhaust gas flowing out from the exhaust purification catalyst.

On the other hand, as shown in FIG. 2B, if the air-fuel ratio of the exhaust gas which flows into the exhaust purification catalyst 20 is the rich air-fuel ratio, when the stored amount of oxygen is large, the oxygen which is stored in the exhaust purification catalyst 20 is released, and the unburned gas in the exhaust gas is removed by oxidation. Further, if the stored amount of oxygen becomes small, the exhaust gas which flows out from the exhaust purification catalyst 20 rapidly rises in concentration of unburned gas at a certain stored amount near zero (in the figure, Clowlim).

In the above way, according to the exhaust purification catalyst 20 which are used in the present embodiment, the characteristics of removal of $NO_X$ and unburned gas in the exhaust gas change depending on the air-fuel ratio of the exhaust gas which flows into the exhaust purification catalyst 20 and stored amount of oxygen. Note that, if having a catalytic action and oxygen storage ability, the exhaust purification catalyst 20 may also be catalysts different from the three-way catalyst.

<Configuration of Air-Fuel Ratio Sensor>

Figure 3:
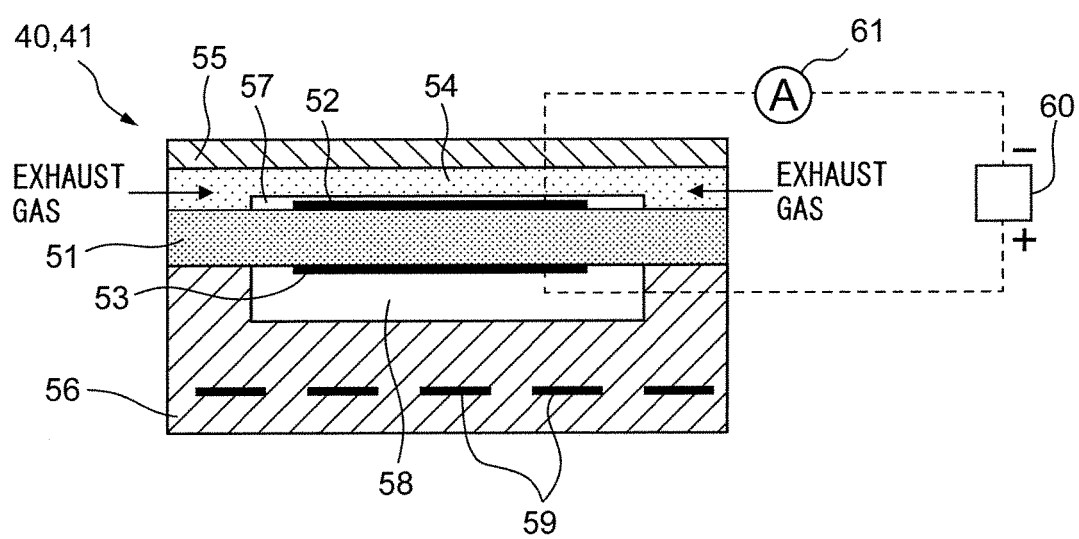
FIG. 3 is a schematic cross-sectional view of an air-fuel ratio sensor.

Next, referring to FIG. 3, the configurations of air-fuel ratio sensors 40 and 41 in the present embodiment will be explained. FIG. 3 is a schematic cross-sectional view of air-fuel ratio sensors 40 and 41. As will be understood from FIG. 3, the air-fuel ratio sensors 40 and 41 in the present embodiment are single-cell type air-fuel ratio sensors each comprised of a solid electrolyte layer and a pair of electrodes forming a single cell.

As shown in FIG. 3, each of the air-fuel ratio sensors 40 and 41 is provided with a solid electrolyte layer 51, an exhaust side electrode (first electrode) 52 which is arranged at one side surface of the solid electrolyte layer 51, an atmosphere side electrode (second electrode) 53 which is arranged at the other side surface of the solid electrolyte layer 51, a diffusion regulation layer 54 which regulates the diffusion of the passing exhaust gas, a protective layer 55 which protects the diffusion regulation layer 54, and a heater part 56 which heats the air-fuel ratio sensor 40 or 41.

On one side surface of the solid electrolyte layer 51, the diffusion regulation layer 54 is provided. On the side surface of the diffusion regulation layer 54 at the opposite side from the side surface of the solid electrolyte layer 51 side, a protective layer 55 is provided. In the present embodiment, a measured gas chamber 57 is formed between the solid electrolyte layer 51 and the diffusion regulation layer 54. In this measured gas chamber 57, the gas to be detected by the air-fuel ratio sensors 40 and 41, that is, the exhaust gas, is introduced through the diffusion regulation layer 54. Further, the exhaust side electrode 52 is arranged inside the measured gas chamber 57, therefore, the exhaust side electrode 52 is exposed to the exhaust gas through the diffusion regulation layer 54. Note that, the measured gas chamber 57 does not necessarily have to be provided. The diffusion regulation layer 54 may directly contact the surface of the exhaust side electrode 52.

On the other side surface of the solid electrolyte layer 51, the heater part 56 is provided. Between the solid electrolyte layer 51 and the heater part 56, a reference gas chamber 58 is formed. Inside this reference gas chamber 58, a reference gas is introduced. In the present embodiment, the reference gas chamber 58 is open to the atmosphere. Therefore, inside the reference gas chamber 58, the atmosphere is introduced as the reference gas. The atmosphere side electrode 53 is arranged inside the reference gas chamber 58, therefore, the atmosphere side electrode 53 is exposed to the reference gas (reference atmosphere).

The heater part 56 is provided with a plurality of heaters 59. These heaters 59 can be used to control the temperature of the air-fuel ratio sensor 40 or 41, in particular, the temperature of the solid electrolyte layers 51. The heater part 56 has a sufficient heat generation capacity for heating the solid electrolyte layer 51 until activating it.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc, is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage Vr is supplied by the voltage supply device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage Vr. The current which is detected by this current detection device 61 is the output current of the air-fuel ratio sensors 40 and 41.

Figure 4:
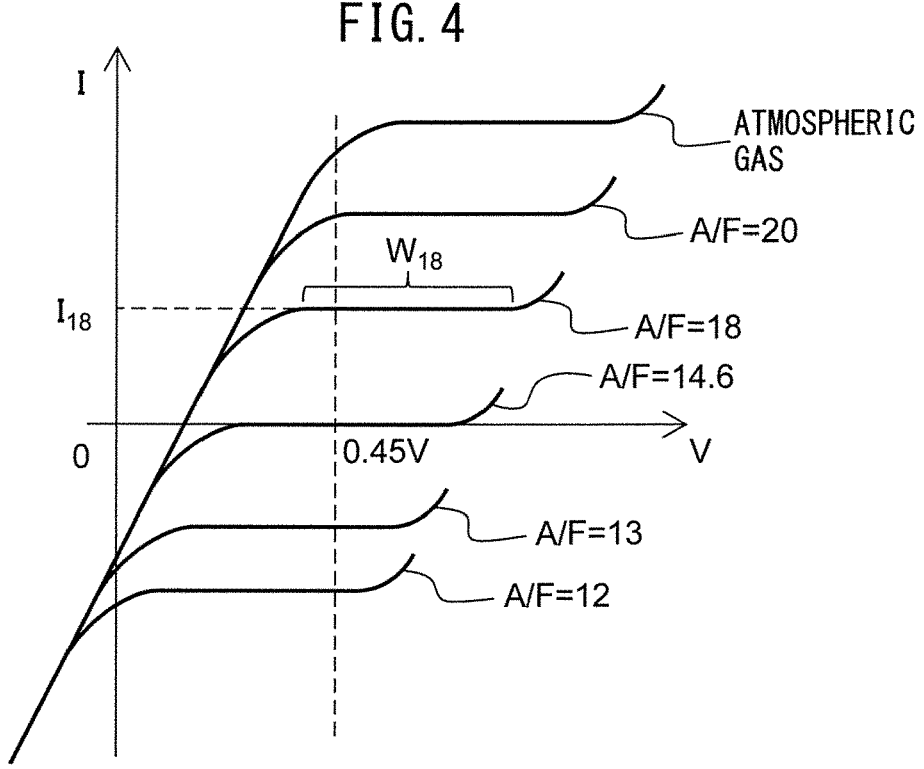
FIG. 4 is a view showing a relationship between a sensor applied voltage and output current at each exhaust air-fuel ratio.

The thus configured air-fuel ratio sensors 40 and 41 have the voltage-current (V-I) characteristic such as shown in FIG. 4. As will be understood from FIG. 4, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 4, the limit current region and limit current when the exhaust air-fuel ratio is 18 are shown by $W_{18}$ and $I_{18}$.

Figure 5:
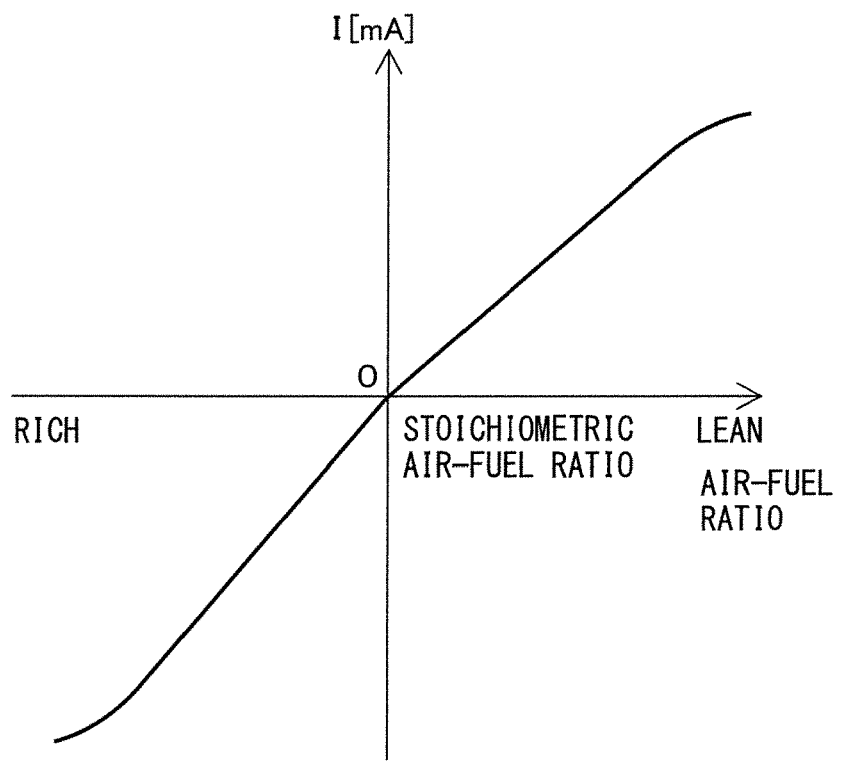
FIG. 5 is a view showing a relationship between an exhaust air-fuel ratio and output current when making the sensor applied voltage constant.

FIG. 5 is a view which shows the relationship between the exhaust air-fuel ratio and the output current I when making the supplied voltage constant at about 0.45V. As will be understood from FIG. 5, in the air-fuel ratio sensors 40 and 41, the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Accordingly, the air-fuel ratio sensors 40 and 41 can continuously (linearly) detect the exhaust air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

In the above example, as the air-fuel ratio sensors 40 and 41, limit current type air-fuel ratio sensors of the structure which is shown in FIG. 3 are used. However, as the air-fuel ratio sensors 40 and 41, for example, it is also possible to use a cup-type limit current type air-fuel ratio sensor or other structure of limit current type air-fuel ratio sensor or air-fuel ratio sensor not a limit current type or any other air-fuel ratio sensor.

<Abnormality Diagnosis of Exhaust Purification Catalyst>

In this regard, sometimes the exhaust purification catalyst 20 deteriorates along with time due to poisoning or heat degradation etc. If the exhaust purification catalyst 20 deteriorates, the purification efficiency of exhaust purification catalyst 20 falls. For this reason, it is desirable to be able to quickly detect if the exhaust purification catalyst 20 has deteriorated and the exhaust purification catalyst 20 is abnormal.

Therefore, in the internal combustion engine of the present embodiment, the downstream side air-fuel ratio sensor 41 is used to calculate the maximum oxygen storage amount of the exhaust purification catalyst 20 and thereby diagnose the exhaust purification catalyst 20 for abnormality. If the maximum oxygen storage amount is smaller than a predetermined reference oxygen storage amount, deterioration may cause the oxygen storage ability of the exhaust purification catalyst 20 to abnormally decline. For this reason, in this case, it is judged that the exhaust purification catalyst 20 is abnormal.

The internal combustion engine of the present disclosure comprises an air-fuel ratio control unit for controlling the air-fuel ratio of the exhaust gas flowing into the exhaust purification catalyst 20, an oxygen storage amount calculating unit for calculating the maximum oxygen storage amount of the exhaust purification catalyst 20, and a catalyst abnormality judging unit for judging if the exhaust purification catalyst 20 is abnormal. Note that, in the present embodiment, the ECU 31 functions as the air-fuel ratio control unit, oxygen storage amount calculating unit, and catalyst abnormality judging unit.

The air-fuel ratio control unit sets the target air-fuel ratio of the exhaust gas flowing into the exhaust purification catalyst 20 (below, simply referred to as the "inflowing exhaust gas") and controls the amount of fuel fed to the combustion chamber 5 so that the air-fuel ratio of the inflowing exhaust gas matches the target air-fuel ratio. Specifically, the air-fuel ratio control unit controls by feedback the amount of fuel fed to the combustion chamber 5 so that the output air-fuel ratio of the upstream side air-fuel ratio sensor 40 matches the target air-fuel ratio. Note that, the amount of fuel fed to the combustion chamber 5 may be controlled without using the upstream side air-fuel ratio sensor 40. In this case, the amount of fuel calculated from the amount of intake air detected by the air flow meter 39 and the target air-fuel ratio is fed to the combustion chamber 5 so that the ratio of the fuel and air fed to the combustion chamber 5 matches the target air-fuel ratio.

The air-fuel ratio control means, when diagnosing the exhaust purification catalyst 20 for abnormality, alternately switches the target air-fuel ratio of the inflowing exhaust gas between a rich set air-fuel ratio richer than the stoichiometric air-fuel ratio and a lean set air-fuel ratio leaner than the stoichiometric air-fuel ratio. The rich set air-fuel ratio is a predetermined air-fuel ratio and is, for example, made 14.1. The lean set air-fuel ratio is a predetermined air-fuel ratio and is, for example, made 16.1. In this Description, this air-fuel ratio control will be referred to as "active control".

Specifically, the air-fuel ratio control unit sets the target air-fuel ratio to the rich set air-fuel ratio, then switches the target air-fuel ratio from the rich set air-fuel ratio to the lean set air-fuel ratio when the air-fuel ratio detected by the downstream side air-fuel ratio sensor 41 reaches a rich judged air-fuel ratio richer than the stoichiometric air-fuel ratio. Further, the air-fuel ratio control unit sets the target air-fuel ratio to the lean set air-fuel ratio then switches the target air-fuel ratio from the lean set air-fuel ratio to the rich set air-fuel ratio when the air-fuel ratio detected by the downstream side air-fuel ratio sensor 41 reaches a lean judged air-fuel ratio leaner than the stoichiometric air-fuel ratio. The rich judged air-fuel ratio is a predetermined air-fuel ratio, for example, is made 14.55. If after the target air-fuel ratio is set to the rich set air-fuel ratio, the output air-fuel ratio of the downstream side air-fuel ratio sensor 41 reaches the rich judged air-fuel ratio, it is judged that exhaust gas richer than the stoichiometric air-fuel ratio has reached the downstream side air-fuel ratio sensor 41. Further, the lean judged air-fuel ratio is a predetermined air-fuel ratio, for example, is made 14.65. If after the target air-fuel ratio is set to the rich set air-fuel ratio, the output air-fuel ratio of the downstream side air-fuel ratio sensor 41 reaches the lean judged air-fuel ratio, it is judged that exhaust gas leaner than the stoichiometric air-fuel ratio has reached the downstream side air-fuel ratio sensor 41.

The oxygen storage amount calculating unit calculates the oxygen excess/deficiency of the inflowing exhaust gas with respect to the stoichiometric air-fuel ratio in the time period of at least part of the air-fuel ratio maintenance time period in which the target air-fuel ratio is maintained at the air-fuel ratio of either the rich set air-fuel ratio and lean set air-fuel ratio. The oxygen excess/deficiency of the inflowing exhaust gas with respect to the stoichiometric air-fuel ratio unit the amount of oxygen in excess or the amount of oxygen short (amount of excess unburned gas, etc.) when trying to make the air-fuel ratio of the inflowing exhaust gas the stoichiometric air-fuel ratio. In lean control where the target air-fuel ratio is set to the lean set air-fuel ratio, the oxygen in the inflowing exhaust gas becomes excessive and this excess oxygen is stored in the exhaust purification catalyst 20. Therefore, the cumulative value of the oxygen excess/deficiency (referred to as the "cumulative oxygen excess/deficiency" below) in the lean control corresponds to the oxygen storage amount stored in the exhaust purification catalyst 20 during the lean control. On the other hand, in rich control where the target air-fuel ratio is set to the rich set air-fuel ratio, the oxygen in the inflowing exhaust gas becomes insufficient and the amount of oxygen lacking is released from the exhaust purification catalyst 20. Therefore, the cumulative oxygen excess/deficiency in the rich control corresponds to the oxygen released amount released from the exhaust purification catalyst 20 during the rich control.

The oxygen excess/deficiency OED is, for example, calculated by the following formula (1) based on the output of the upstream side air-fuel ratio sensor 40:

$$OED=0.23\times(AFup-14.6)\times Qi' \tag{1}$$

where, 0.23 is the concentration of oxygen in the air, is the quantity of fuel injection, AFup is the output air-fuel ratio of the upstream side air-fuel ratio sensor 40, and 14.6 is the stoichiometric air-fuel ratio.

Note that, the oxygen excess/deficiency OED may be calculated, without using the output of the upstream side air-fuel ratio sensor 40, based on the target air-fuel ratio TAF of the inflowing exhaust gas. In this case, the oxygen excess/deficiency OED is calculated by the following formula (2):

$$OED=0.23\times(TAF-14.6)\times Qi \tag{2}$$

The oxygen storage amount calculating unit calculates the absolute value of the cumulative oxygen excess/deficiency as the maximum oxygen storage amount of the exhaust purification catalyst 20. Further, the catalyst abnormality judging unit judges that the exhaust purification catalyst 20 is abnormal when the maximum oxygen storage amount calculated by the oxygen storage amount calculating unit is smaller than a predetermined reference oxygen amount. On the other hand, the catalyst abnormality judging unit judges that the exhaust purification catalyst 20 is not abnormal, that is, that the exhaust purification catalyst 20 is normal, when the maximum oxygen storage amount calculated by the oxygen storage amount calculating unit is a predetermined reference oxygen amount or more.

Figure 6:
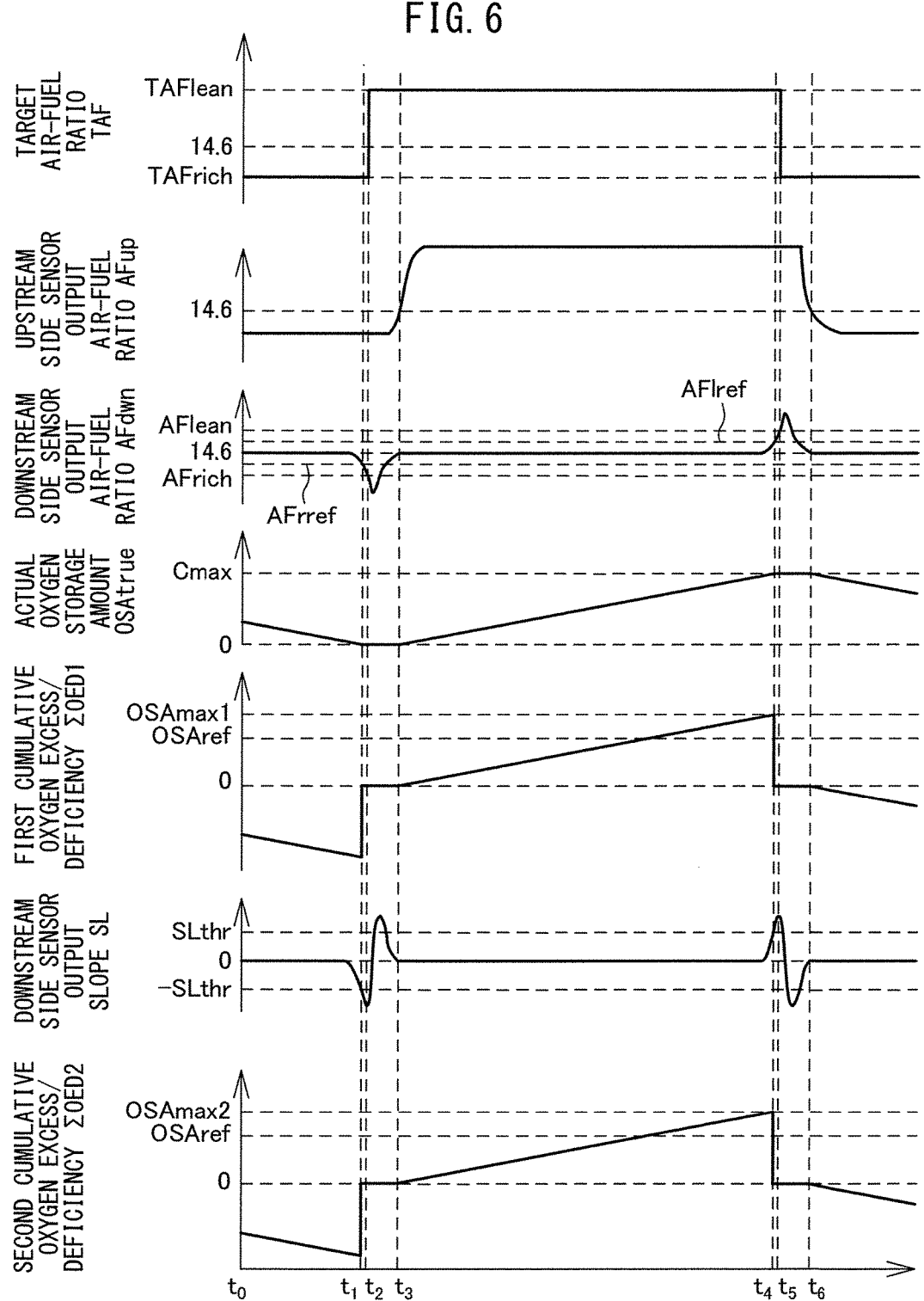
FIG. 6 is a time chart of a target air-fuel ratio of inflowing exhaust gas etc. when diagnosing a normal exhaust purification catalyst for abnormality.

Below, referring to the time charts of FIG. 6 to FIG. 8, the abnormality diagnosis of the exhaust purification catalyst 20 will be specifically explained. FIG. 6 is a time chart showing the target air-fuel ratio TAF of the inflowing exhaust gas, output air-fuel ratio AFup of the upstream side air-fuel ratio sensor 40 (below, also referred to as "the upstream side output air-fuel ratio AFup"), output air-fuel ratio AFdwn of the downstream side air-fuel ratio sensor 41 (below, also referred to as the "downstream side output air-fuel ratio AFdwn"), actual oxygen storage amount OSAtrue of the exhaust purification catalyst 20, first cumulative oxygen excess/deficiency ΣOED1, output slope SL of the downstream side air-fuel ratio sensor 41, and second cumulative oxygen excess/deficiency ΣOED2 at the time of diagnosing a normal exhaust purification catalyst 20 for abnormality. The first cumulative oxygen excess/deficiency ΣOED1 and second cumulative oxygen excess/deficiency ΣOED2 shown in FIG. 6 show cumulative values of the oxygen excess/deficiency OED calculated by the above formula (1). Note that, the "output slope SL of the downstream side air-fuel ratio sensor 41" means the derivative of the downstream side output air-fuel ratio AFdwn, that is, the slope of the change along with time of the downstream side output air-fuel ratio AFdwn. Further, the "output air-fuel ratio" means the air-fuel ratio corresponding to the output value of the air-fuel ratio sensor.

<First Abnormality Diagnosis Method>

First, as a comparative example of the present disclosure, a first abnormality diagnosis method calculating the absolute value of the first cumulative oxygen excess/deficiency ΣOED1 as the maximum oxygen storage amount of the exhaust purification catalyst 20 and diagnosing the exhaust purification catalyst 20 for abnormality will be explained.

In the example of FIG. 6, before the time $t_2$, the target air-fuel ratio TAF is set to the rich set air-fuel ratio TAFrich. At the time $t_0$, the exhaust purification catalyst 20 sufficiently stores oxygen, so exhaust gas richer than the stoichiometric air-fuel ratio is purified by the exhaust purification catalyst 20. For this reason, at the time $t_0$, the downstream side output air-fuel ratio AFdwn is the stoichiometric air-fuel ratio. After this, if the oxygen storage amount of the exhaust purification catalyst 20 approaches zero, exhaust gas richer than the stoichiometric air-fuel ratio starts to flow out from the exhaust purification catalyst 20. As a result, at the time $t_2$, the downstream side output air-fuel ratio AFdwn reaches the rich judged air-fuel ratio AFrich.

If at the time $t_2$ the downstream side output air-fuel ratio AFdwn becomes the rich judged air-fuel ratio AFrich or less, the target air-fuel ratio TAF is switched from the rich set air-fuel ratio TAFrich to the lean set air-fuel ratio TAFlean. As a result, the oxygen storage amount of the exhaust purification catalyst 20 increases and the downstream side output air-fuel ratio AFdwn changes toward the stoichiometric air-fuel ratio after the time $t_2$.

Further, after the time $t_2$, along with the switching of the target air-fuel ratio TAF, the upstream side output air-fuel ratio AFup changes from an air-fuel ratio richer than the stoichiometric air-fuel ratio to an air-fuel ratio leaner than the stoichiometric air-fuel ratio. From when switching the target air-fuel ratio TAF to when the actual air-fuel ratio of the inflowing exhaust gas changes, a time lag occurs. For this reason, the upstream side output air-fuel ratio AFup starts to change toward the stoichiometric air-fuel ratio after a predetermined time elapses after the time $t_2$. In the example of FIG. 6, the upstream side output air-fuel ratio AFup becomes the stoichiometric air-fuel ratio or more at the time $t_3$.

After the time $t_3$, if the oxygen storage amount of the exhaust purification catalyst 20 further increases and approaches the maximum oxygen storage amount Cmax, exhaust gas leaner than the stoichiometric air-fuel ratio starts to flow out from the exhaust purification catalyst 20. As a result, at the time $t_5$, the downstream side output air-fuel ratio AFdwn reaches the lean judged air-fuel ratio AFlean. After the time $t_5$, along with the switching of the target air-fuel ratio TAF, the upstream side output air-fuel ratio AFup changes from an air-fuel ratio leaner than the stoichiometric air-fuel ratio to an air-fuel ratio richer than the stoichiometric air-fuel ratio. In the example of FIG. 6, the upstream side output air-fuel ratio AFup becomes the stoichiometric air-fuel ratio or less at the time $t_6$.

As explained above, in active control, when the downstream side output air-fuel ratio AFdwn reaches the rich judged air-fuel ratio AFrich, the target air-fuel ratio TAF is switched from the rich set air-fuel ratio TAFrich to the lean set air-fuel ratio TAFlean. The rich judged air-fuel ratio AFrich is made an air-fuel ratio which the air-fuel ratio of the exhaust gas flowing out from the exhaust purification catalyst 20 will not reach when the oxygen storage amount of the exhaust purification catalyst 20 is not zero. Therefore, in active control, the target air-fuel ratio TAF is switched from the rich set air-fuel ratio TAFrich to the lean set air-fuel ratio TAFlean after oxygen completely finishes being released from the exhaust purification catalyst 20.

For this reason, when the target air-fuel ratio TAF is switched to the lean set air-fuel ratio TAFlean (time $t_2$ at FIG. 6), the oxygen storage amount of the exhaust purification catalyst 20 is zero. In this case, in the air-fuel ratio maintenance time period in which the target air-fuel ratio TAF is maintained at the lean set air-fuel ratio TAFlean (time $t_2$ to time $t_5$ in FIG. 6), when the upstream side output air-fuel ratio AFup becomes the stoichiometric air-fuel ratio or more (time $t_3$ in FIG. 6), it is considered that lean exhaust gas flows into the exhaust purification catalyst 20 and oxygen starts to be stored in the exhaust purification catalyst 20.

Further, as shown in FIG. 2A, if the oxygen storage amount of the exhaust purification catalyst 20 becomes greater, the concentrations of oxygen and $NO_X$ in the exhaust gas flowing out from the exhaust purification catalyst 20 rapidly rise at a certain storage amount near the maximum oxygen storage amount Cmax (Cuplim in figure). For this reason, when the downstream side output air-fuel ratio AFdwn becomes a lean side reference air-fuel ratio AFlref slightly leaner than the stoichiometric air-fuel ratio or becomes more (time $t_4$ in FIG. 6), it is considered that the oxygen storage amount of the exhaust purification catalyst 20 is substantially maximum. In other words, when the downstream side output air-fuel ratio AFdwn becomes the lean side reference air-fuel ratio AFlref or more (time $t_4$ in FIG. 6), it is considered that oxygen is finished being stored in the exhaust purification catalyst 20. The lean side reference air-fuel ratio AFlref is determined in advance and made a value leaner than the stoichiometric air-fuel ratio and richer than the lean judged air-fuel ratio AFlean.

Therefore, in the first abnormality diagnosis method, the oxygen excess/deficiency OED cumulatively added in the time period after the target air-fuel ratio TAF is switched to the lean set air-fuel ratio TAFlean from when the upstream side output air-fuel ratio AFup becomes, the stoichiometric air-fuel ratio or more to when the downstream side output air-fuel ratio AFdwn becomes the lean side reference air-fuel ratio AFlref or more is calculated as the maximum oxygen storage amount of the exhaust purification catalyst 20. FIG. 6 shows the thus calculated maximum oxygen storage amount as the first maximum oxygen storage amount OSAmax1. Note that, the first cumulative oxygen excess/deficiency ΣOED1 is reset and made zero at the end point of the cumulative addition of the oxygen excess/deficiency OED, that is, when the downstream side output air-fuel ratio AFdwn becomes the lean side reference air-fuel ratio AFlref or more.

In the example of FIG. 6, the first maximum oxygen storage amount OSAmax1 is the reference oxygen storage amount OSAref or more. Therefore, it is judged that the exhaust purification catalyst 20 is not abnormal. Note that, the reference oxygen storage amount OSAref is determined in advance and is made the lower limit value of the maximum oxygen storage amount of the normal exhaust purification catalyst 20.

Further, as explained above, in active control, when the downstream side output air-fuel ratio AFdwn reaches the lean judged air-fuel ratio AFlean, the target air-fuel ratio TAF is switched from the lean set air-fuel ratio TAFlean to the rich set air-fuel ratio TAFrich. The lean judged air-fuel ratio AFlean is made an air-fuel ratio which the air-fuel ratio of the exhaust gas flowing out from the exhaust purification catalyst 20 will not reach when the oxygen storage amount of the exhaust purification catalyst 20 is not the maximum. Therefore, in active control, the target air-fuel ratio TAF is switched from the lean set air-fuel ratio TAFlean to the rich set air-fuel ratio TAFrich when oxygen from the exhaust purification catalyst 20 completely finishes being stored.

For this reason, when the target air-fuel ratio TAF is switched to the rich set air-fuel ratio TAFrich, the oxygen storage amount of the exhaust purification catalyst 20 is maximum. In this case, in the air-fuel ratio maintenance time period in which the target air-fuel ratio TAF is maintained at the rich set air-fuel ratio TAFrich, when the upstream side output air-fuel ratio AFup becomes the stoichiometric air-fuel ratio or less, it is considered that rich exhaust gas flows into the exhaust purification catalyst 20 and oxygen starts to be released from the exhaust purification catalyst 20.

Further, as shown in FIG. 2B, if the oxygen storage amount becomes small, the concentration of unburned gas in the exhaust gas flowing out from the exhaust purification catalyst 20 rapidly rises at a certain amount of storage near zero (Clowlim in the figure). For this reason, when the downstream side output air-fuel ratio AFdwn becomes a rich side reference air-fuel ratio AFrref slightly richer than the stoichiometric air-fuel ratio or becomes less, it is considered that the oxygen storage amount of the exhaust purification catalyst 20 becomes substantially zero. In other words, when the downstream side output air-fuel ratio AFdwn becomes the rich side reference air-fuel ratio AFrref or less, it is considered that oxygen finishes being released from the exhaust purification catalyst 20. The rich side reference air-fuel ratio AFrref is determined in advance and is made a value richer than the stoichiometric air-fuel ratio and leaner than the rich judged air-fuel ratio AFrich.

Therefore, in the first abnormality diagnosis method, the absolute value of the oxygen excess/deficiency OED cumulatively added in the time period after the target air-fuel ratio TAF is switched to the rich set air-fuel ratio TAFrich from when the upstream side output air-fuel ratio AFup becomes the stoichiometric air-fuel ratio or less to when the downstream side output air-fuel ratio AFdwn becomes a rich side reference air-fuel ratio AFrref or less may be calculated as the maximum oxygen storage amount of the exhaust purification catalyst 20. Note that, the average value of the maximum oxygen storage amount calculated during lean control and the maximum oxygen storage amount calculated during rich control may be made the maximum oxygen storage amount of the exhaust purification catalyst 20. Further, the target air-fuel ratio TAF may be switched a plurality of times and the average value of the maximum oxygen storage amounts calculated during lean control and rich control may be made the maximum oxygen storage amount of the exhaust purification catalyst 20.

<Problems in First Abnormality Diagnosis Method>

Figure 7:
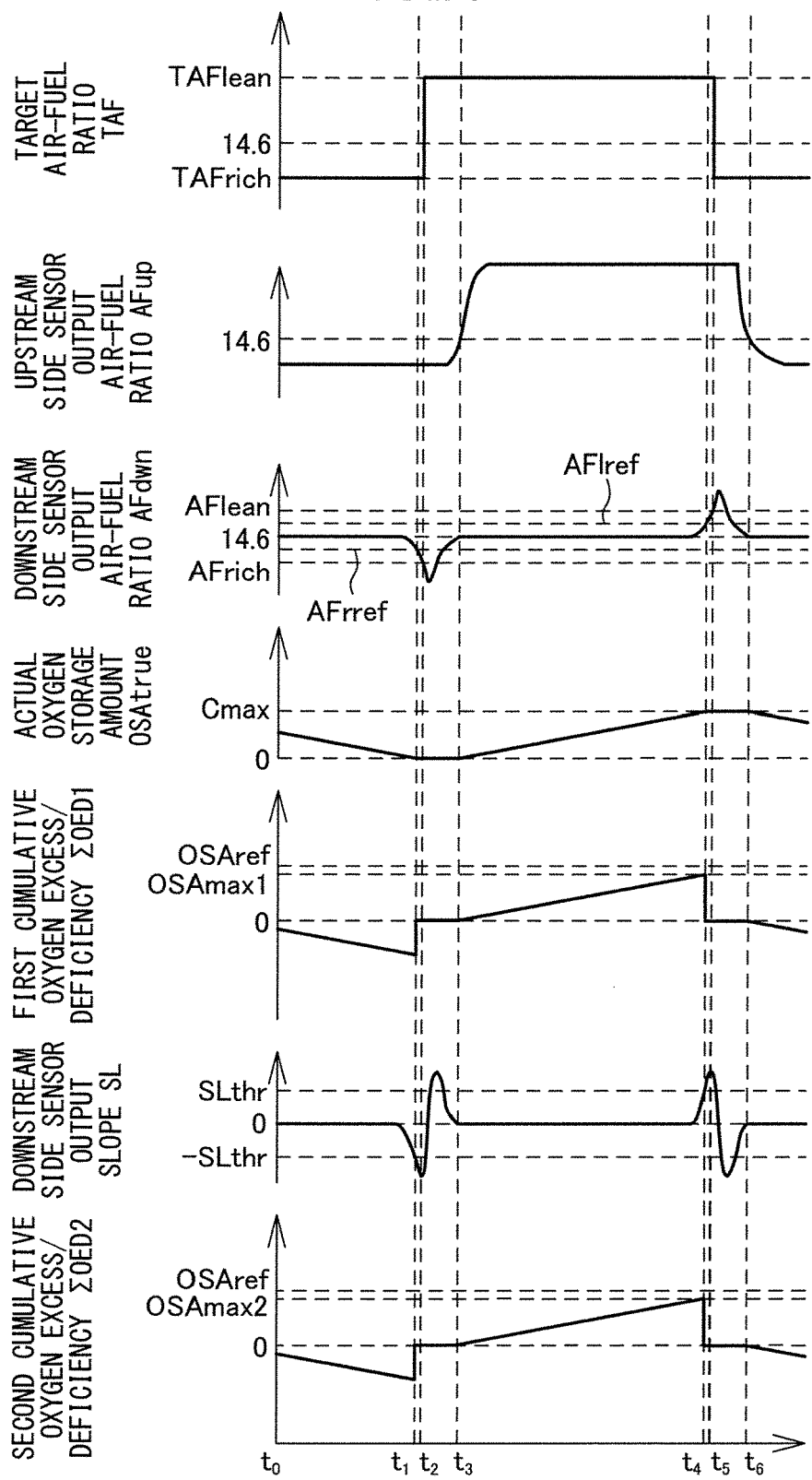
FIG. 7 is a time chart of a target air-fuel ratio of inflowing exhaust gas etc. when diagnosing an abnormal exhaust purification catalyst for abnormality.

FIG. 7 is a time chart of the target air-fuel ratio TAF, upstream side output air-fuel ratio AFup, downstream side output air-fuel ratio AFdwn, actual oxygen storage amount OSAtrue of the exhaust purification catalyst 20, first cumulative oxygen excess/deficiency ΣOED1, output slope SL of the downstream side air-fuel ratio sensor 41, and second cumulative oxygen excess/deficiency ΣOED2 when diagnosing an abnormal exhaust purification catalyst 20 for abnormality. In FIG. 7, air-fuel ratio control similar to FIG. 6 is performed. In the example of FIG. 7, the exhaust purification catalyst 20 deteriorates and the exhaust purification catalyst 20 falls in oxygen storage ability. For this reason, in lean control, the time period from when the upstream side output air-fuel ratio AFup becomes the stoichiometric air-fuel ratio or more to when the downstream side output air-fuel ratio AFdwn becomes the lean side reference air-fuel ratio AFlref or more (time $t_3$ to time $t_4$ in FIG. 7) becomes shorter than the example of FIG. 6. As a result, the first maximum oxygen storage amount OSAmax1 in FIG. 7 is smaller than the first maximum oxygen storage amount OSAmax1 in FIG. 6. In the example of FIG. 7, the first maximum oxygen storage amount OSAmax1 is smaller than the reference oxygen storage amount OSAref, so it is judged that the exhaust purification catalyst 20 is abnormal.

Figure 8:
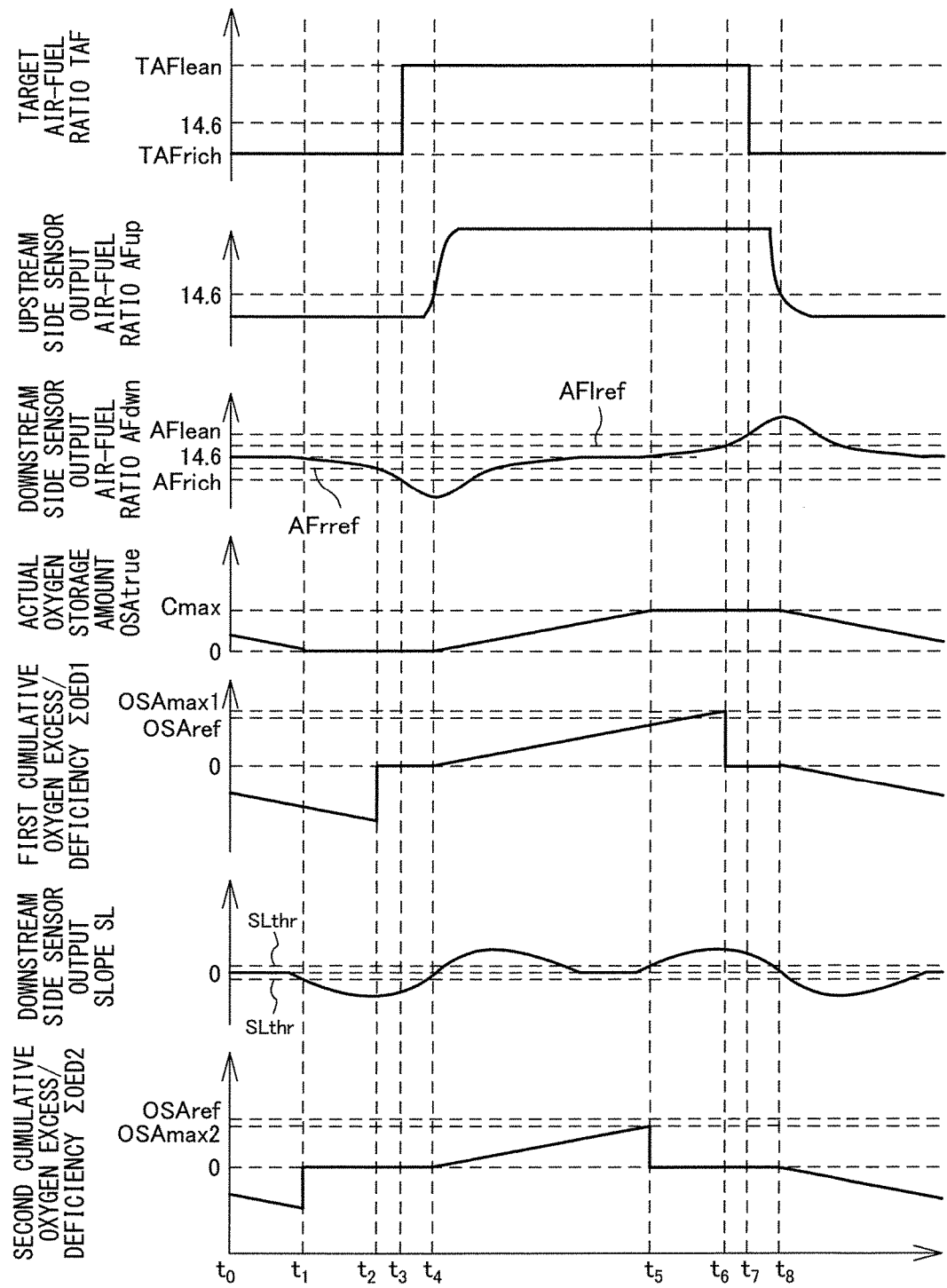
FIG. 8 is a time chart of a target air-fuel ratio of inflowing exhaust gas etc. when diagnosing an abnormal exhaust purification catalyst for abnormality.

FIG. 8 is a time chart of the target air-fuel ratio TAF, upstream side output air-fuel ratio AFup, downstream side output air-fuel ratio AFdwn, actual oxygen storage amount OSAtrue of the exhaust purification catalyst 20, first cumulative oxygen excess/deficiency ΣOED1, output slope SL of the downstream side air-fuel ratio sensor 41, and second cumulative oxygen excess/deficiency ΣOED2 when diagnosing an abnormal exhaust purification catalyst 20 for abnormality. In the example of FIG. 8, air-fuel ratio control similar to FIG. 6 and FIG. 7 is performed. Further, in the example of FIG. 7 and FIG. 8, the actual maximum oxygen storage amount Cmax of the exhaust purification catalyst 20 diagnosed for abnormality is the same. That is, in the example of FIG. 8 as well, the exhaust purification catalyst 20 deteriorates and the exhaust purification catalyst 20 falls in oxygen storage ability.

On the other hand, in the example of FIG. 8, unlike the example of FIG. 7, the response characteristic of the downstream side air-fuel ratio sensor 41 is abnormal. In this case, as shown in FIG. 8, the absolute value of the output slope SL of the downstream side air-fuel ratio sensor 41 when the downstream side output air-fuel ratio AFdwn changes becomes smaller. For this reason, in the example of FIG. 8, the time period from when the target air-fuel ratio TAF is switched to the lean set air-fuel ratio TAFlean to when the downstream side output air-fuel ratio AFdwn becomes the lean side reference air-fuel ratio AFlref or more (time $t_3$ to time $t_6$ in FIG. 8) becomes longer than the example of FIG. 7. Further, in the example of FIG. 8, the response characteristic of the upstream side air-fuel ratio sensor 40 is not abnormal, so the time from when the target air-fuel ratio TAF is switched to the lean set air-fuel ratio TAFlean to when the upstream side output air-fuel ratio AFup becomes the stoichiometric air-fuel ratio or more (time $t_3$ to time $t_4$ in FIG. 8) is the same as the example of FIG. 7. Therefore, in the example of FIG. 8, the time during which the oxygen excess/deficiency OED is cumulatively added in lean control becomes longer, so the first maximum oxygen storage amount OSAmax1 becomes larger than the example of FIG. 7. Note that, even if the maximum oxygen storage amount is calculated during rich control, the maximum oxygen storage amount is calculated larger in the same way as lean control.

In the example of FIG. 8, the first maximum oxygen storage amount OSAmax1 is larger than the reference oxygen amount OSAref, so it is judged that the exhaust purification catalyst 20 is not abnormal. Therefore, in the first abnormality diagnosis method, if the response characteristic of the downstream side air-fuel ratio sensor 41 is abnormal, even if the exhaust purification catalyst 20 has deteriorated, it is sometimes judged that the exhaust purification catalyst 20 is not abnormal.

<Abnormality Diagnosis Method in Present Embodiment>

Therefore, in the internal combustion engine of the present embodiment, the second abnormality diagnosis method is used to diagnose the exhaust purification catalyst 20 for abnormality so as to enable the diagnosis of the exhaust purification catalyst 20 for abnormality to be performed precisely even if the response characteristic of the downstream side air-fuel ratio sensor 41 is abnormal. In the second abnormality diagnosis method, the absolute value of the second cumulative oxygen excess/deficiency ΣOED2 is calculated as the maximum oxygen storage amount of the exhaust purification catalyst 20 for diagnosis of the exhaust purification catalyst 20 for abnormality.

In the second abnormality diagnosis method, the end point of the cumulative addition of the oxygen excess/deficiency OED is determined by a method different from the first abnormality diagnosis method. Specifically, in the second abnormality diagnosis method, in the air-fuel ratio maintenance time period in which the target air-fuel ratio TAF is maintained at an air-fuel ratio of either the rich set air-fuel ratio TAFrich and lean set air-fuel ratio TAFlean, the oxygen excess/deficiency OED cumulatively added in the time period from when the upstream side output air-fuel ratio AFup reaches the stoichiometric air-fuel ratio to when the absolute value of the output slope SL of the downstream side air-fuel ratio sensor 41 finally becomes less than the threshold value is calculated as the maximum oxygen storage amount of the exhaust purification catalyst 20. Further, the threshold value of the output slope SL is made larger when the maximum value of the absolute value of the output slope SL in the air-fuel ratio maintenance time period is relatively large compared to when the maximum value of the absolute value of the output slope SL is relatively small.

Below, referring to the time charts of FIG. 6 to FIG. 8, the second abnormality diagnosis method will be specifically explained.

In the example of FIG. 6, in the lean control time period from the time $t_2$ to the time $t_5$, the time $t_4$ corresponds to the point of time that the absolute value of the output slope SL of the downstream side air-fuel ratio sensor 41 finally becomes less than the threshold value SLthr. Therefore, in the example of FIG. 6, the time $t_4$ is made the end point of cumulative addition of the oxygen excess/deficiency OED. Further, as explained above, in the example of FIG. 6, the upstream side output air-fuel ratio AFup reaches the stoichiometric air-fuel ratio at the time $t_3$. Therefore, in the example of FIG. 6, the time $t_3$ is made the starting point of cumulative addition of the oxygen excess/deficiency OED. In FIG. 6, the oxygen excess/deficiency OED cumulatively added in the time period from the time $t_3$ to the time $t_4$ is shown as the second maximum oxygen storage amount OSAmax2.

In the example of FIG. 6, the second maximum oxygen storage amount OSAmax2 is larger than the reference oxygen storage amount OSAref. Therefore, it is judged that the exhaust purification catalyst 20 is not abnormal. In the example of FIG. 6, the second maximum oxygen storage amount OSAmax2 calculated by the second abnormality diagnosis method is the same as the first maximum oxygen storage amount OSAmax1 calculated by the first abnormality diagnosis method.

In the example of FIG. 7 as well, the second maximum oxygen storage amount OSAmax2 is calculated in the same way as the example of FIG. 6. In the example of FIG. 7, the second maximum oxygen storage amount OSAmax2 is smaller than the reference oxygen storage amount OSAref. Therefore, it is judged that the exhaust purification catalyst 20 is abnormal. In the example of FIG. 7, the second maximum oxygen storage amount OSAmax2 calculated by the second abnormality diagnosis method is the same as the first maximum oxygen storage amount OSAmax1 calculated by the first abnormality diagnosis method. Further, in the example of FIG. 7, the maximum value of the absolute value of the output slope SL of the downstream side air-fuel ratio sensor 41 is the same as the example of FIG. 6. For this reason, in the examples of FIG. 6 and FIG. 7, the threshold value SLthr is made the same value.

In the example of FIG. 8 as well, the second maximum oxygen storage amount OSAmax2 is calculated in the same way as the example of FIG. 6 and FIG. 7. However, in the example of FIG. 8, the response characteristic of the downstream side air-fuel ratio sensor 41 is abnormal, so the maximum value of the absolute value of the output slope SL of the downstream side air-fuel ratio sensor 41 is smaller than the example of FIG. 6 and FIG. 7. For this reason, in the example of FIG. 8, the threshold value SLthr is made smaller than the examples of FIG. 6 and FIG. 7. The second maximum oxygen storage amount OSAmax2 in the example of FIG. 8 is smaller than the reference oxygen storage amount OSAref. Therefore, it is judged that the exhaust purification catalyst 20 is abnormal. Further, in the example of FIG. 8, the second maximum oxygen storage amount OSAmax2 calculated by the second abnormality diagnosis method is smaller than the first maximum oxygen storage amount OSAmax1 calculated by the first abnormality diagnosis method.

The larger the amount of primary delay in the response characteristic of the downstream side air-fuel ratio sensor 41, the smaller the maximum value of the absolute value of the output slope SL of the downstream side air-fuel ratio sensor 41. Therefore, by making the threshold value SLthr smaller the smaller the maximum value of the absolute value of the output slope SL, even if the response characteristic of the downstream side air-fuel ratio sensor 41 is abnormal, the end point of the cumulative addition of the oxygen excess/deficiency OED can be suitably determined. Therefore, in the second abnormality diagnosis method, even if the reaction characteristic of the downstream side sensor is abnormal, it is possible to precisely calculate the maximum oxygen storage amount of the exhaust purification catalyst 20 and in turn possible to precisely diagnose the exhaust purification catalyst 20 for abnormality.

Note that, in the second abnormality diagnosis method, the time that the target air-fuel ratio TAF is switched (for example, the time $t_2$ in FIG. 6) may be made the starting point of cumulative addition of the oxygen excess/deficiency OED. In this case, compared to when making the time that the upstream side output air-fuel ratio AFup reaches the stoichiometric air-fuel ratio the starting point of the cumulative addition of the oxygen excess/deficiency OED, the cumulative time period becomes longer, so the second maximum oxygen storage amount OSAmax2 is calculated larger. For this reason, compared to when making the time that the upstream side output air-fuel ratio AFup reaches the stoichiometric air-fuel ratio the starting point of the cumulative addition of the oxygen excess/deficiency OED, the reference oxygen storage amount OSAref is made larger.

<Control Routine of Abnormality Diagnosis>

Figure 9:
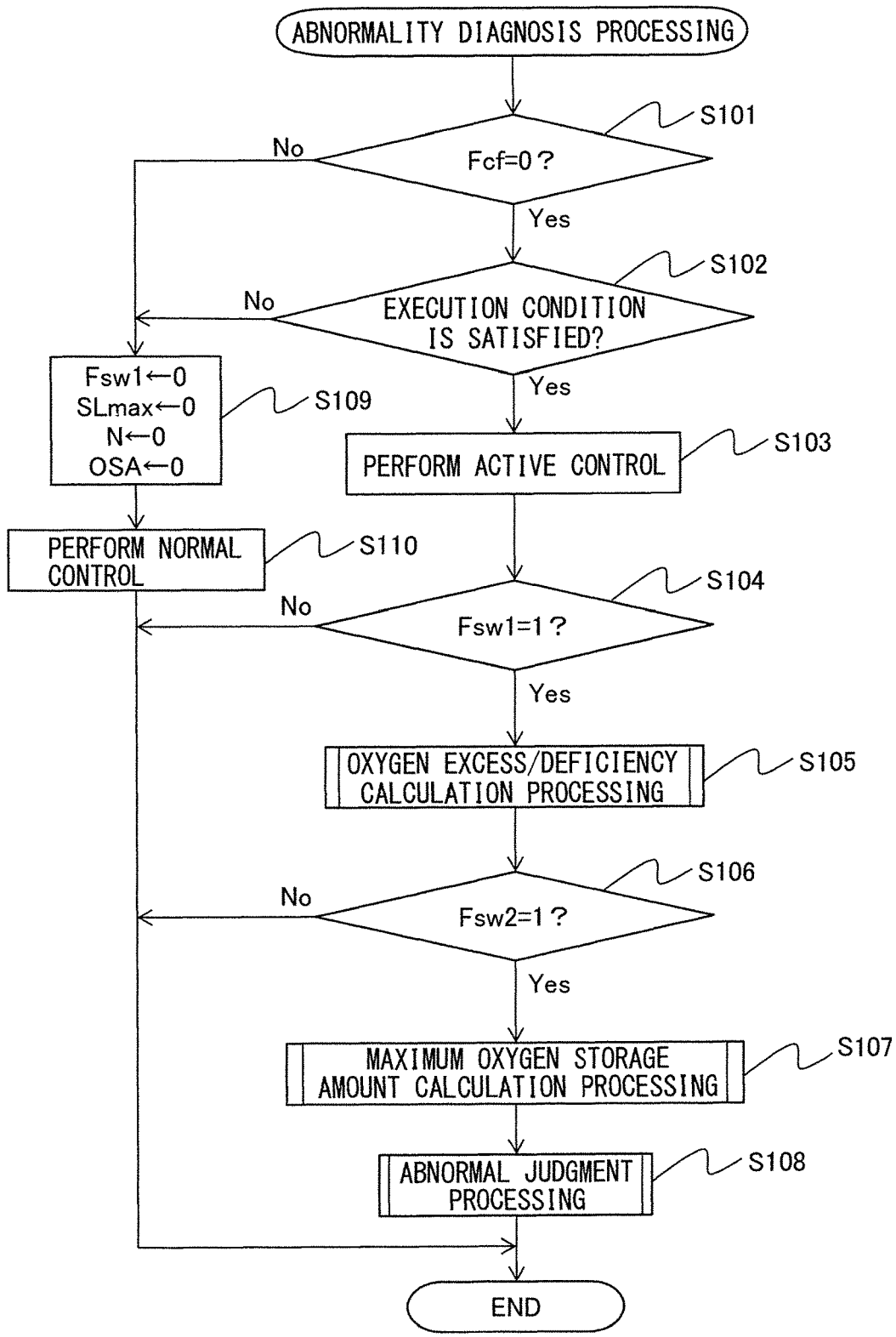
FIG. 9 is a flow chart showing a control routine of abnormality diagnosis processing of an exhaust purification catalyst.

Below, referring to the flow chart of FIG. 9, the abnormality diagnosis method of the exhaust purification catalyst 20 in the present embodiment, that is, the above-mentioned second abnormality diagnosis method, will be explained in detail. FIG. 9 is a flow chart showing a control routine of abnormality diagnosis processing of the exhaust purification catalyst 20. In the illustrated control routine, by cumulatively adding the oxygen excess/deficiency OED during lean control or rich control, the maximum oxygen storage amount OSAmax is calculated. Based on the calculated maximum oxygen storage amount OSAmax, it is judged that the exhaust purification catalyst 20 is abnormal.

The illustrated control routine is performed by interruption every certain time interval. First, at step S101, it is judged if the catalyst abnormality judgment flag Fcf is zero. The catalyst abnormality judgment flag Fcf is a flag set to "1" if it is judged that the exhaust purification catalyst 20 is abnormal by the later mentioned abnormality judgment processing. If at step S101 it is judged that the catalyst abnormality judgment flag Fcf is zero, the routine proceeds to step S102.

At step S102, it is judged if the condition for performing abnormality diagnosis processing is satisfied. The output of the downstream side air-fuel ratio sensor 41 sometimes fluctuates due to the atmospheric pressure, temperature of the sensor device, etc. For this reason, at step S102, to raise the precision of abnormality diagnosis, for example, it is judged if the atmospheric pressure and temperature of the sensor device are within predetermined ranges. If the atmospheric pressure and temperature of the sensor device are within predetermined ranges, it is judged that the condition for performing abnormality diagnosis processing is satisfied. Further, the abnormality diagnosis may be performed just once for each startup of the internal combustion engine, so at step S102, it may be judged if an abnormality diagnosis has already been performed after startup of the internal combustion engine. If the abnormality diagnosis has already been performed after startup of the internal combustion engine, it is judged that the condition for abnormality diagnosis processing is not satisfied. At step S102, if it is judged that condition for performing the abnormality diagnosis processing is satisfied, the routine proceeds to step S103.

At step S103, the above-mentioned active control is performed. Specifically, the target air-fuel ratio TAF of the inflowing exhaust gas is alternately switched between a rich set air-fuel ratio TAFrich richer than the stoichiometric air-fuel ratio, and a lean set air-fuel ratio TAFlean leaner than the stoichiometric air-fuel ratio.

Next, at step S104, it is judged if the first target air-fuel ratio switching flag Fsw1 is "1". The first target air-fuel ratio switching flag Fsw1 is a flag which is made "1" when the target air-fuel ratio TAF is switched in active control. If at step S104 it is judged that the first target air-fuel ratio switching flag Fsw1 is "1", that is, if the target air-fuel ratio TAF is switched in active control, the routine proceeds to step S105. On the other hand, if it is judged that the first target air-fuel ratio switching flag Fsw1 is zero, the present control routine is ended.

At step S105, the later explained oxygen excess/deficiency calculation processing is performed. Next, at step S106, it is judged if the second target air-fuel ratio switching flag Fsw2 is "1". The second target air-fuel ratio switching flag Fsw2 is a flag which is made "1" when the first target air-fuel ratio switching flag Fsw1 is "1" and the target air-fuel ratio TAF is switched in active control. In other words, the second target air-fuel ratio switching flag Fsw2 is a flag which is made "1" when the target air-fuel ratio TAF is switched in active control, then the target air-fuel ratio TAF is again switched. If at step S106 it is judged that the second target air-fuel ratio switching flag Fsw2 is "1", that is, if the target air-fuel ratio TAF is continuously switched in active control, the routine proceeds to step S107. On the other hand, if it is judged that the second target air-fuel ratio switching flag Fsw2 is zero, the present control routine is ended.

At step S107, the later explained maximum oxygen storage amount calculation processing is performed. Next, at step S108, the later explained abnormality judgment processing is performed. After step S108, the present control routine is ended.

On the other hand, if at step S101 it is judged that the catalyst abnormality judgment flag Fcf is "1", that is, it is already judged that the exhaust purification catalyst 20 is abnormal, the routine proceeds to step S109. Further, if at step S102 it is judged that the condition for performing abnormality diagnosis processing is not satisfied, the routine proceeds to step S109. In this case, the exhaust purification catalyst 20 is not diagnosed for abnormality.

At step S109, the first target air-fuel ratio switching flag Fsw1, maximum value SLmax of the output slope, buffering number N, and oxygen storage amount OSA are reset and made zero. Note that, the maximum value SLmax of the output slope, buffering number N, and oxygen storage amount OSA are parameters calculated by the later explained oxygen excess/deficiency calculation processing.

Next, at step S110, the normal control is performed. In the normal control, the air-fuel ratio of the inflowing exhaust gas is controlled based on the engine operating state etc. After step S110, the present control routine is ended.

<Control Routine of Oxygen Excess/Deficiency Calculation Processing>

Figure 10:
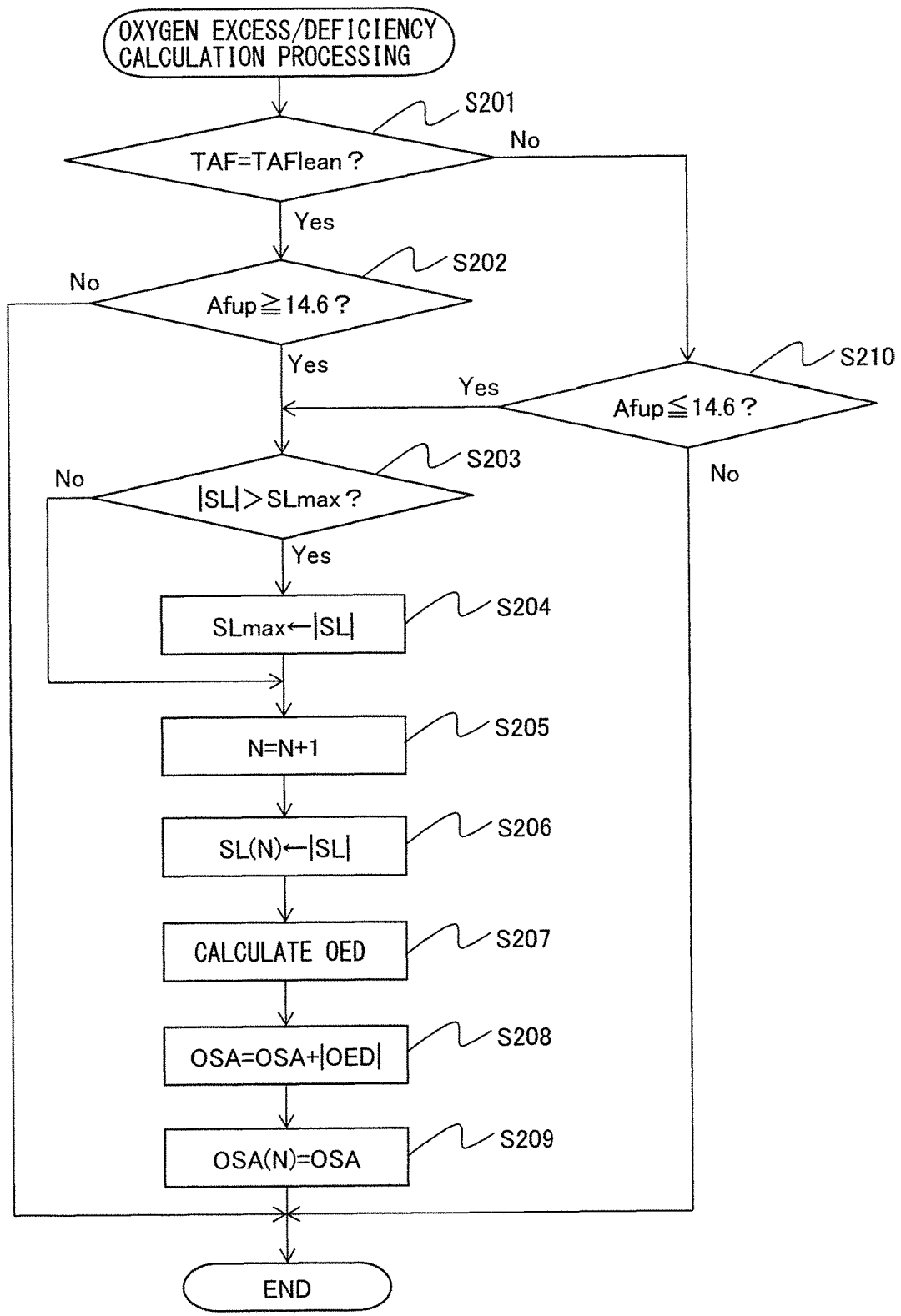
FIG. 10 is a flow chart showing a control routine of oxygen excess/deficiency calculation processing.

Below, referring to the flow chart of FIG. 10, the oxygen excess/deficiency calculation processing at step S105 of FIG. 9 will be explained. FIG. 10 is a flow chart showing a control routine of oxygen excess/deficiency calculation processing. In the control routine of oxygen excess/deficiency calculation processing, the oxygen excess/deficiency OED etc. are calculated at lean control or rich control in active control.

First, at step S201, it is judged if the target air-fuel ratio TAF of the inflowing exhaust gas is the lean set air-fuel ratio TAFlean. If it is judged that the target air-fuel ratio TAF is the lean set air-fuel ratio TAFlean, that is, if lean control is being performed in active control, the routine proceeds to step S202.

At step S202, it is judged if the upstream side output air-fuel ratio AFup is the stoichiometric air-fuel ratio (14.6) or more. If it is judged that the upstream side output air-fuel ratio AFup is the stoichiometric air-fuel ratio or more, the routine proceeds to step S203. On the other hand, if it is judged that the upstream side output air-fuel ratio AFup is less than the stoichiometric air-fuel ratio, the present control routine is ended.

At step S203, the output slope SL of the downstream side air-fuel ratio sensor 41 is calculated and it is judged if the absolute value of the output slope SL of the downstream side air-fuel ratio sensor 41 is larger than the maximum value SLmax of the output slope. The output slope SL of the downstream side air-fuel ratio sensor 41 is, for example, calculated by dividing the amount of change of the downstream side output air-fuel ratio AFdwn at the very short time ΔT, which is the interval of execution of the abnormality diagnosis processing, by the very short time ΔT. If at step S203 it is judged that the absolute value of the output slope SL of the downstream side air-fuel ratio sensor 41 is larger than the maximum value SLmax of the output slope, the routine proceeds to step S204.

At step S204, the maximum value SLmax of the output slope is made the absolute value of the output slope SL calculated at step S203. Therefore, the maximum value SLmax of the output slope is updated. After step S204, the routine proceeds to step S205. On the other hand, if at step S203 it is judged that the absolute value of the output slope SL of the downstream side air-fuel ratio sensor 41 is the maximum value SLmax of the output slope or less, the routine proceeds to step S205 without updating the maximum value SLmax of the output slope at step S204.

At step S205, the value of the buffering number N plus 1 is made the new buffering number N. Note that, the initial value of the buffering number N is made zero. Next, at step S206, the N-th output slope SL(N) is made the absolute value of the output slope SL calculated at step S203. The buffering number N is the value calculated at step S205. The N-th output slope SL(N) is buffered at the RAM 33 of the ECU 31.

Next, at step S207, the oxygen excess/deficiency OED is calculated. The oxygen excess/deficiency OED is, for example, calculated by the above formula (1) or formula (2) using the amount of injected fuel fed to the combustion chamber 5 in the very short time ΔT. Next, at step S208, the value of the oxygen storage amount OSA plus the absolute value of the oxygen excess/deficiency OED is made the new oxygen storage amount OSA. The oxygen excess/deficiency OED is the value calculated at step S207.

Next, at step S209, the N-th oxygen storage amount OSA(N) is made the oxygen storage amount OSA calculated at step S208. The buffering number N is the value calculated at step S205. The N-th oxygen storage amount OSA(N) is buffered at the RAM 33 of the ECU 31. After step S209, the present control routine is ended.

On the other hand, if at step S201 it is judged that the target air-fuel ratio TAF is the rich set air-fuel ratio TAFrich, that is, if rich control is performed at active control, the routine proceeds to step S210. At step S210, it is judged if the upstream side output air-fuel ratio AFup is the stoichiometric air-fuel ratio (14.6) or less. If it is judged that the upstream side output air-fuel ratio AFup is the stoichiometric air-fuel ratio or less, the routine proceeds to step S203. After this, the above-mentioned step S203 to step S209 is executed. On the other hand, if at step S210 it is judged that the upstream side output air-fuel ratio AFup is larger than the stoichiometric air-fuel ratio, the present control routine is ended.

<Control Routine of Maximum Oxygen Storage Amount Calculation Processing>

Figure 11:
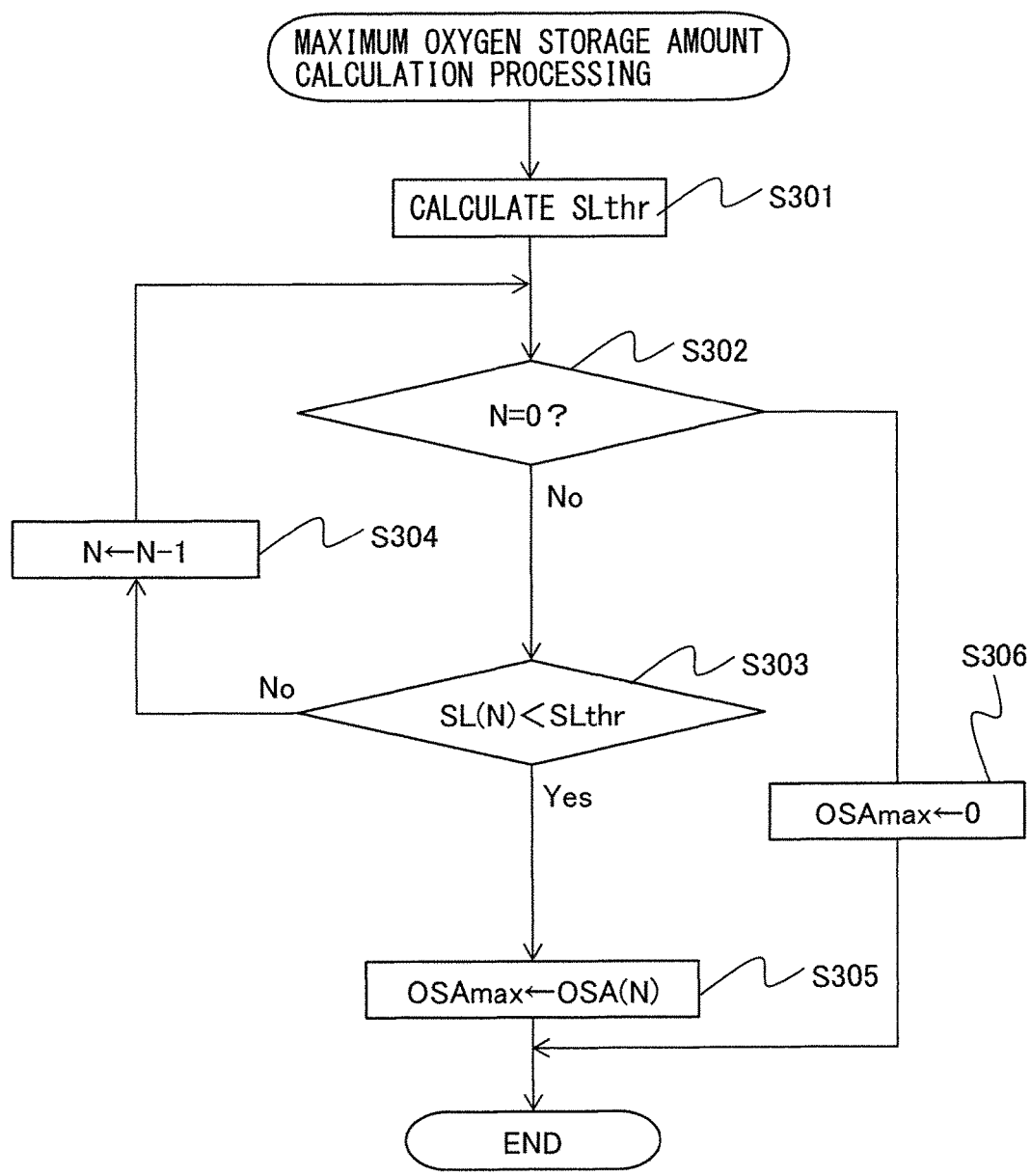
FIG. 11 is a flow chart showing a control routine of maximum oxygen storage amount calculation processing.

Below, referring to the flow chart of FIG. 11, the maximum oxygen storage amount calculation processing in step S107 of FIG. 9 will be explained. FIG. 11 is a flow chart showing a control routine of maximum oxygen storage amount calculation processing. In the control routine of maximum oxygen storage amount calculation processing, the value buffered at the oxygen excess/deficiency calculation processing is used to calculate the maximum oxygen storage amount OSAmax.

First, at step S301, the threshold value SLthr of the output slope of the downstream side air-fuel ratio sensor 41 is calculated. The threshold value SLthr is calculated based on the maximum value SLmax of the output slope calculated at step S204 in FIG. 10. The threshold value SLthr is, for example, calculated based on the map shown as a function of the maximum value SLmax of the output slope. Specifically, in the above map, the threshold value SLthr is shown as becoming larger the larger the maximum value SLmax of the output slope. Further, the threshold value SLthr is made a value smaller than the maximum value SLmax of the output slope.

Next, at step S302, it is judged if the buffering number N is zero. The buffering number N is a value calculated at step S205 of FIG. 10. That is, the buffering number N means the number of times in lean control or rich control that the output slope SL and oxygen storage amount OSA are repeatedly calculated and buffered. If at step S302 it is judged that the buffering number N is not zero, the routine proceeds to step S303. At step S303, it is judged if the n-th output slope SL(N) is smaller than the threshold value SLthr calculated at step S301. For the N-th output slope SL(N), the value buffered at the oxygen excess/deficiency calculation processing is called up. If it is judged that the N-th output slope SL(N) is the threshold value SLthr or more, the routine proceeds to step S304. At step S304, the value of the buffering number N minus 1 is made the new buffering number N. After step S304, the routine returns to step S302. If at step S303 it is judged that the N-th output slope SL(N) is smaller than the threshold value SLthr, the routine proceeds to step S305.

At step S305, the N-th oxygen storage amount OSA(N) is made the maximum oxygen storage amount OSAmax. Due to this, the oxygen excess/deficiency OED cumulatively added in the time period from when the upstream side output air-fuel ratio AFup reaches the stoichiometric air-fuel ratio in the air-fuel ratio maintenance time period to when the absolute value of the output slope SL of the downstream side air-fuel ratio sensor 41 finally becomes less than the threshold value is calculated as the maximum oxygen storage amount OSAmax of the exhaust purification catalyst 20. The reason why is the buffering number N corresponds to when the absolute value of the output slope SL of the downstream side air-fuel ratio sensor 41 finally becomes less than the threshold value SLthr in the air-fuel ratio maintenance time period. After step S305, the present control routine is ended.

On the other hand, if at step S302 it is judged that the buffering number N is zero, the routine proceeds to step S306. At step S306, the maximum oxygen storage amount OSAmax is made zero. The case where at step S302 it is judged that the buffering number N is zero is when the values of all buffered output slopes are the threshold value SLthr or more or the case where the number of buffered output slope is one.

<Control Routine of Abnormality Judgment Processing>

Figure 12:
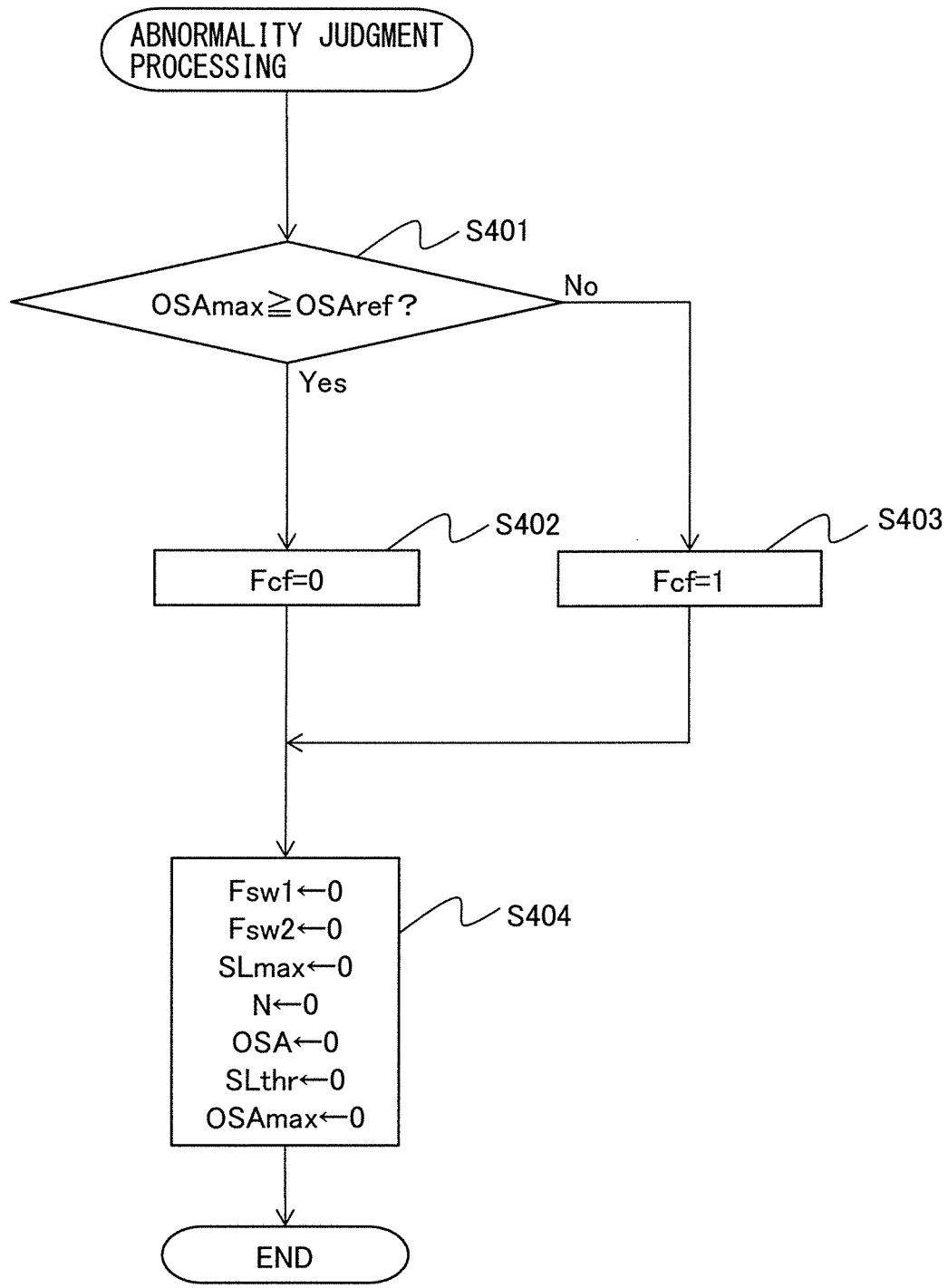
FIG. 12 is a flow chart showing a control routine of abnormality judgment processing.

Below, referring to the flow chart of FIG. 12, the abnormality judgment processing at step S108 of FIG. 9 will be explained. FIG. 12 is a flow chart showing a control routine of abnormality judgment processing. In the control routine of abnormality judgment processing, the maximum oxygen storage amount OSAmax calculated at the oxygen excess/deficiency calculation processing is used to judge if the exhaust purification catalyst 20 is abnormal.

First, at step S401, it is judged if the maximum oxygen storage amount OSAmax is the reference oxygen storage amount OSAref or more. The maximum oxygen storage amount OSAmax is the value calculated at step S305 or step S306 of FIG. 11. The reference oxygen storage amount OSAref is determined in advance and is made the lower limit value of the maximum oxygen storage amount of a normal exhaust purification catalyst 20.

If at step S401 it is judged that the maximum oxygen storage amount OSAmax is the reference oxygen storage amount OSAref or more, the routine proceeds to step S402. At step S402, it is judged that the exhaust purification catalyst 20 is not abnormal and the catalyst abnormality judgment flag Fcf is made zero. On the other hand, if at step S401 it is judged that the maximum oxygen storage amount OSAmax is smaller than the reference oxygen storage amount OSAref, the routine proceeds to step S403. At step S403, it is judged that the exhaust purification catalyst 20 is abnormal, and the catalyst abnormality judgment flag Fcf is made 1.

After step S402 or step S403, the routine proceeds to step S404. At step S404, the first target air-fuel ratio switching flag Fsw1, second target air-fuel ratio switching flag Fsw2, maximum value SLmax of the output slope, buffering number N, oxygen storage amount OSA, threshold value SLthr, and maximum oxygen storage amount OSAmax are reset and made zero. After step S404, the present control routine is ended.

Note that, the time that the target air-fuel ratio TAF is switched in active control may be made the starting point of the cumulative addition of the oxygen excess/deficiency OED for calculating the maximum oxygen storage amount OSAmax. In this case, step S201, step S202, and step S210 of FIG. 10 are omitted. Further, the maximum oxygen storage amount OSAmax may be calculated a plurality of times and, at step S401 of FIG. 12, it may be judged if the average value of the plurality of maximum oxygen storage amount OSAmax is the reference oxygen storage amount OSAref or more.

Second Embodiment

Next, a second embodiment of the present disclosure will be explained. Note that, the configuration and control of the internal combustion engine of the second embodiment are basically similar to the internal combustion engine of the first embodiment, so, in the following description, parts different from the first embodiment will primarily be explained.

The inventors of the present application obtained the following discoveries relating to fluctuations of output of the downstream side air-fuel ratio sensor 41 in the case where the exhaust purification catalyst 20 is normal and the temperature of the exhaust purification catalyst 20 is low. Specifically, in active control, from when switching the target air-fuel ratio from the rich set air-fuel ratio to the lean set air-fuel ratio to when the output air-fuel ratio of the downstream side air-fuel ratio sensor 41 reaches the lean judged air-fuel ratio, the output slope of the downstream side air-fuel ratio sensor 41 becomes substantially constant. This is considered to be due to the fact that when the temperature of the exhaust purification catalyst 20 is low and the exhaust purification catalyst 20 is not activated, even after switching the target air-fuel ratio to the lean set air-fuel ratio, carbon monoxide continues to flow out from the exhaust purification catalyst 20 for a predetermined time.

Figure 13:
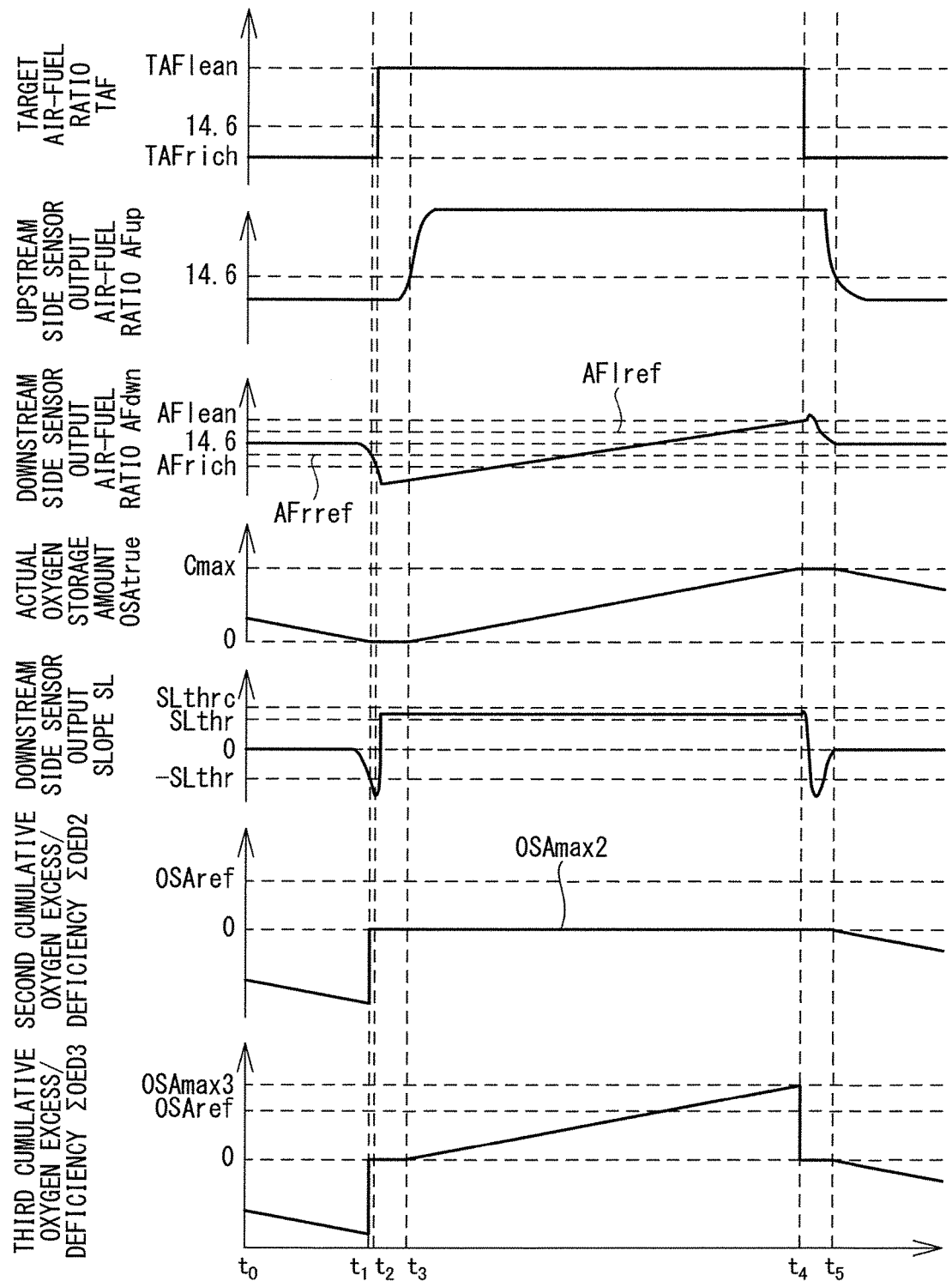
FIG. 13 is a time chart of a target air-fuel ratio of inflowing exhaust gas etc. when diagnosing a normal exhaust purification catalyst for abnormality.

Referring to FIG. 13, this phenomenon will be specifically explained. FIG. 13 is a time chart of the target air-fuel ratio TAF, upstream side output air-fuel ratio AFup, downstream side output air-fuel ratio AFdwn, actual oxygen storage amount OSAtrue of the exhaust purification catalyst 20, output slope SL of the downstream side air-fuel ratio sensor 41, second cumulative oxygen excess/deficiency ΣOED2, and third cumulative oxygen excess/deficiency ΣOED3 when diagnosing a normal exhaust purification catalyst 20 for abnormality.

In FIG. 13, air-fuel ratio control similar to FIG. 6 is performed. Further, in the examples of FIG. 6 and FIG. 13, the actual maximum oxygen storage amount Cmax of the exhaust purification catalyst 20 diagnosed for abnormality is the same. On the other hand, in the example of FIG. 13, the amount of intake air is small and the temperature of the exhaust purification catalyst 20 is low. For this reason, from when switching the target air-fuel ratio TAF from the rich set air-fuel ratio TAFrich to the lean set air-fuel ratio TAFlean to when the output air-fuel ratio of the downstream side air-fuel ratio sensor 41 reaches the lean judged air-fuel ratio AFlean, the output slope SL of the downstream side air-fuel ratio sensor 41 becomes substantially constant. This output slope SL is larger than the threshold value SLthr of the output slope SL. For this reason, the second maximum oxygen storage amount OSAmax2 calculated by the above-mentioned second abnormality diagnosis method becomes zero. As a result, the second maximum oxygen storage amount OSAmax2 becomes smaller than the reference oxygen amount OSAref, so it is judged that the exhaust purification catalyst 20 is abnormal. Therefore, when the temperature of the exhaust purification catalyst 20 is low, even if the exhaust purification catalyst 20 is normal, sometimes the exhaust purification catalyst 20 is mistakenly judged as being abnormal.

Therefore, in the internal combustion engine of the second embodiment, if the maximum oxygen storage amount of the exhaust purification catalyst 20 is calculated during lean control, the threshold value SLthr of the output slope SL of the downstream side air-fuel ratio sensor 41 is corrected based on the temperature of the exhaust purification catalyst 20 in the air-fuel ratio maintenance time period in which the target air-fuel ratio TAF is maintained at the lean set air-fuel ratio TAFlean. Specifically, the threshold value SLthr of the output slope SL is made larger when the temperature of the exhaust purification catalyst 20 is relatively low compared to when the temperature of the exhaust purification catalyst 20 is relatively high.

For this reason, the internal combustion engine in the second embodiment comprises a catalyst temperature estimating unit for estimating the temperature of the exhaust purification catalyst 20. The catalyst temperature estimating unit is, for example, a temperature sensor 23 provided at the casing 21 housing the exhaust purification catalyst 20. The temperature sensor 23 can detect the temperature of the exhaust purification catalyst 20 (bed temperature). Note that, it is also possible to provide a temperature sensor in the exhaust passage to detect the temperature of the exhaust gas in the exhaust passage and estimate the temperature of the exhaust purification catalyst 20 from the detected temperature of the exhaust gas. Further, the temperature of the exhaust purification catalyst 20 may be estimated based on the operating state of the internal combustion engine (intake air amount etc.).

In the example of FIG. 13, the temperature of the exhaust purification catalyst 20 is low, so is corrected so that the threshold value SLthr of the output slope SL becomes larger. FIG. 13 shows the corrected threshold value SLthrc. In the example of FIG. 13, at the time $t_3$ to the time $t_4$, the output slope SL of the downstream side air-fuel ratio sensor 41 is smaller than the corrected threshold value SLthc, so the third maximum oxygen storage amount OSAmax3 calculated based on the corrected threshold value SLthc becomes larger than the reference oxygen amount OSAref. As a result, it is judged that the exhaust purification catalyst 20 is not abnormal, that is, the exhaust purification catalyst 20 is normal. Therefore, in second embodiment, even if the temperature of the exhaust purification catalyst 20 is low, it is possible to precisely calculate the maximum oxygen storage amount of the exhaust purification catalyst 20 and in turn possible to precisely diagnose the exhaust purification catalyst 20 for abnormality.

Note that, if making the threshold value SLthr of the output slope SL larger when the temperature of the exhaust purification catalyst 20 is low, if using a downstream side air-fuel ratio sensor 41 with an abnormal response characteristic to calculate the maximum oxygen storage amount of the abnormal exhaust purification catalyst 20, the maximum oxygen storage amount of the exhaust purification catalyst 20 will be calculated larger than the actual one. The reason is that by making the threshold value SLthr of SL larger, the cumulative time period of the oxygen excess/deficiency OED becomes longer. However, if the temperature of the exhaust purification catalyst 20 is low, the amount of intake air is often small. For this reason, if the cumulative time period of the oxygen excess/deficiency OED becomes longer, the cumulatively added oxygen storage amount will become smaller. Therefore, when the temperature of the exhaust purification catalyst 20 is low, even if making the threshold value SLthr of the output slope SL larger, there is little possibility of judging that the abnormal exhaust purification catalyst 20 is normal.

Further, in the second embodiment as well, in the same way as the first embodiment, the time that the target air-fuel ratio TAF is switched (for example, time $t_2$ in FIG. 13) may be made the starting point of the cumulative addition of the oxygen excess/deficiency OED. In this case, the cumulative time period becomes longer compared to when making the time that the upstream side output air-fuel ratio AFup reaches the stoichiometric air-fuel ratio the starting point of the cumulative addition of the oxygen excess/deficiency OED, so the third maximum oxygen storage amount OSAmax3 is calculated larger. For this reason, the reference oxygen storage amount OSAref is made larger compared to when making the time that the upstream side output air-fuel ratio AFup reaches the stoichiometric air-fuel ratio the starting point of the cumulative addition of the oxygen excess/deficiency OED.

<Control Routine of Abnormality Diagnosis>

Figure 14:
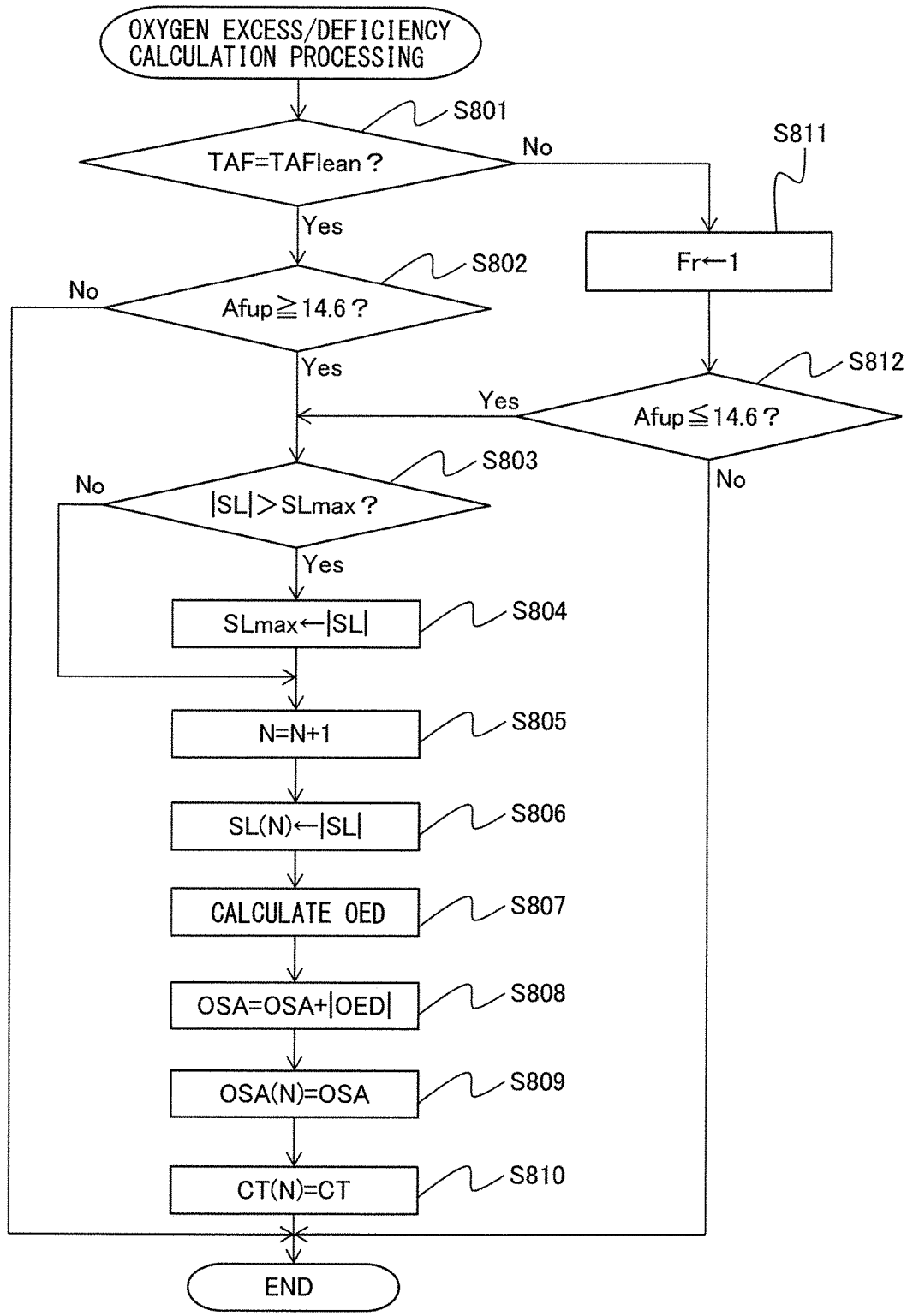
FIG. 14 is a flow chart showing a control routine of oxygen excess/deficiency calculation processing.
Figure 15:
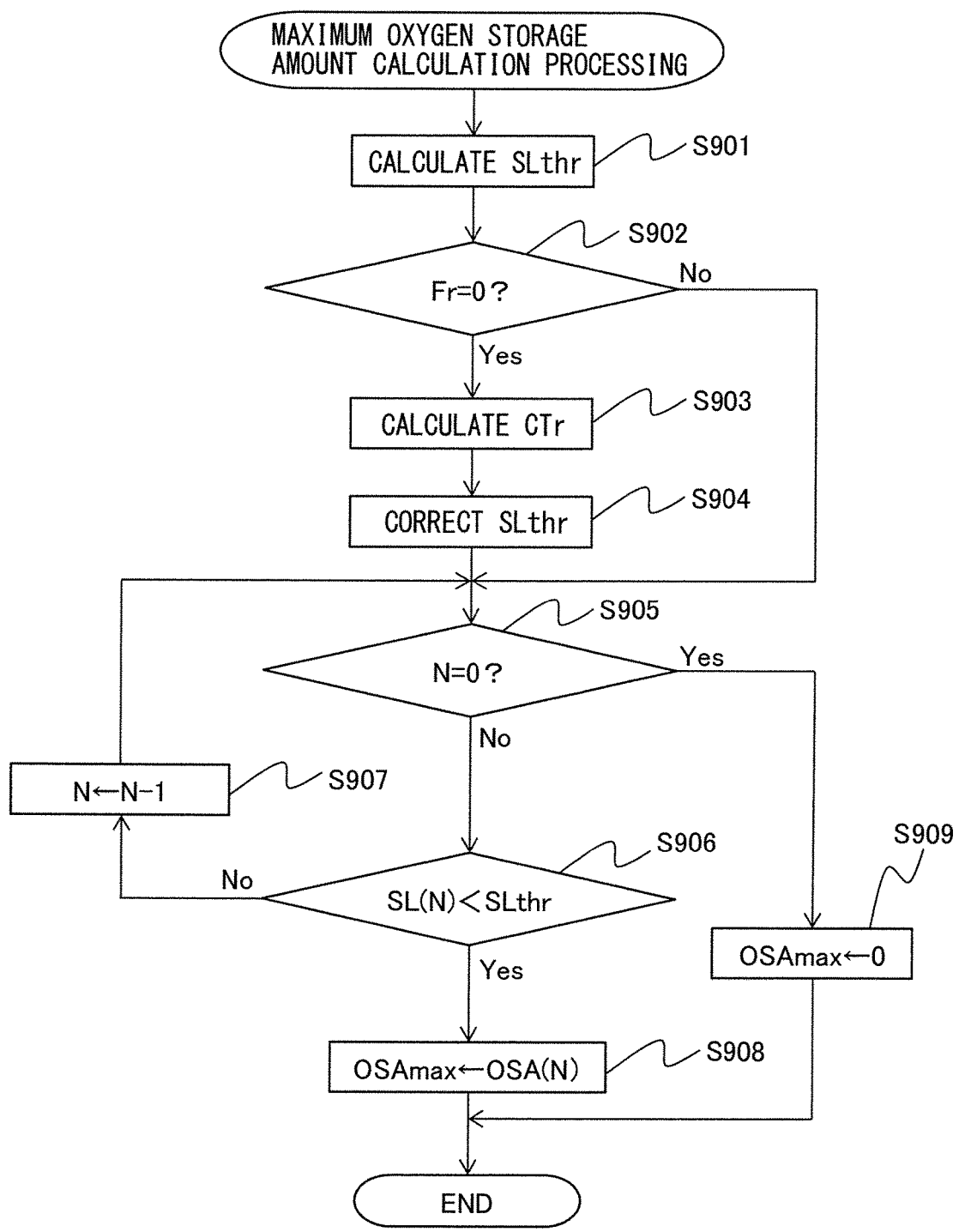
FIG. 15 is a flow chart showing a control routine of maximum oxygen storage amount calculation processing.

In the second embodiment, the control routine of abnormality diagnosis processing of the exhaust purification catalyst 20 shown in FIG. 9 is performed. In the second embodiment, unlike the first embodiment, the oxygen excess/deficiency calculation processing shown in FIG. 14 is performed at step S105 in FIG. 9. Further, the maximum oxygen storage amount calculation processing shown in FIG. 15 is performed at step S107 in FIG. 9. Furthermore, at step S109 in FIG. 9, the later mentioned rich judgment flag Fr is reset and made zero.

<Control Routine of Oxygen Excess/Deficiency Calculation Processing>

Below, referring to the flow chart of FIG. 14, the oxygen excess/deficiency calculation processing in the second embodiment will be explained. FIG. 14 is a flow chart showing a control routine of oxygen excess/deficiency calculation processing. In the control routine of oxygen excess/deficiency calculation processing, the oxygen excess/deficiency OED etc. are calculated at lean control or rich control in active control. Step S801 to step S809 and step S812 at FIG. 14 are similar to step S201 to step S209 and step S210 at FIG. 10, so explanations will be omitted.

In the present control routine, if at step S801 it is judged that the target air-fuel ratio TAF is the rich set air-fuel ratio TAFrich, that is, if rich control is performed in active control, the routine proceeds to step S811. At step S811, the rich judgment flag Fr is made "1". Note that, the initial value of the rich judgment flag is made zero. After step S811, the routine proceeds to step S812.

Further, in the present control routine, after step S809, the routine proceeds to step S810. At step S810, the temperature CT of the exhaust purification catalyst 20 is detected and the N-th catalyst temperature CT(N) is made the detected temperature CT. The buffering number N is the value calculated at step S805. The N-th catalyst temperature CT(N) is buffered at RAM 33 of the ECU 31. Note that, the temperature CT of the exhaust purification catalyst 20 is, for example, detected by the temperature sensor 23. After step S810, the present control routine is ended.

<Control Routine of Maximum Oxygen Storage Amount Calculation Processing>

Below, referring to the flow chart of FIG. 15, the maximum oxygen storage amount calculation processing at the second embodiment will be explained. FIG. 15 is a flow chart showing a control routine of maximum oxygen storage amount calculation processing. In the control routine of maximum oxygen storage amount calculation processing, a value buffered at the oxygen excess/deficiency calculation processing is used to calculate the maximum oxygen storage amount OSAmax. Step S901 and step S905 to step S909 at FIG. 15 are similar to step S301 and step S302 to step S306 at FIG. 11, so explanations will be omitted.

In the present control routine, after step S901, the routine proceeds to step S902. At step S902, it is judged if the rich judgment flag Fr is zero. If it is judged that the rich judgment flag Fr is zero, that is, if the oxygen excess/deficiency OED is calculated during lean control in active control, the routine proceeds to step S903.

At step S903, the temperature CTr of the exhaust purification catalyst 20 in the lean control is calculated. The temperature CTr is, for example, calculated as the average value of the temperature CT of the exhaust purification catalyst 20 detected during lean control. In this case, the temperature CTr is calculated by dividing the total of all of the temperatures CT(1) to CT(N) buffered at step S810 in FIG. 14 by the buffering number N. Note that, the first detected temperature CT(1) or the finally detected temperature CT(N) may be made the temperature CTr. Further, it is also possible to detect the temperature of the exhaust purification catalyst 20 at the time of start or time of end of lean control and make the detected temperature the temperature CTr. After step S903, the routine proceeds to step S904.

At step S904, the threshold value SLthr calculated at step S901 is corrected based on the temperature CTr calculated at step S903. Specifically, the corrected threshold value SLthrc is made larger when the temperature CTr is relatively low compared to when the temperature CTr is relatively high. Further, the corrected threshold value SLthrc may be calculated based on a map shown as a function of the maximum value SLmax of the output slope and temperature CTr. Specifically, in the above map, the corrected threshold value SLthrc is shown as becoming larger the larger the maximum value SLmax of the output slope. Further, the corrected threshold value SLthrc is shown as becoming larger the lower the temperature CTr. After step S904, the routine proceeds to step S905.

On the other hand, if at step S902 the rich judgment flag Fr is "1", that is, if the oxygen excess/deficiency OED during the rich control in active control is calculated, the routine proceeds to step S905. Therefore, if the oxygen excess/deficiency OED is calculated during rich control in active control, the threshold value SLthr is not corrected.

Further, in the second embodiment, at step S404 in the control routine of abnormality judgment processing shown in FIG. 12, the rich judgment flag Fr is also reset and is made zero.

Third Embodiment

Next, a third embodiment of the present disclosure will be explained. Note that, the configuration and control of the internal combustion engine of the third embodiment are basically similar to the internal combustion engine of the first embodiment and second embodiment, so, in the following description, parts different from the first embodiment and second embodiment will primarily be explained. In the third embodiment, in addition to the abnormality diagnosis of the exhaust purification catalyst 20, the abnormality diagnosis of the downstream side air-fuel ratio sensor 41 is performed.

In the third embodiment, to diagnose the exhaust purification catalyst 20 and downstream side air-fuel ratio sensor 41 for abnormality, active control similar to the first embodiment and second embodiment is performed. Therefore, the air-fuel ratio control unit alternately switches the target air-fuel ratio of the inflowing exhaust gas between a rich set air-fuel ratio richer than the stoichiometric air-fuel ratio and a lean set air-fuel ratio leaner than the stoichiometric air-fuel ratio. The rich set air-fuel ratio is an air-fuel ratio determined in advance and, for example, is made 14.1. The lean set air-fuel ratio is an air-fuel ratio determined in advance and, for example, is made 16.1.

Specifically, after setting the target air-fuel ratio to the rich set air-fuel ratio, the air-fuel ratio control unit switches the target air-fuel ratio from the rich set air-fuel ratio to the lean set air-fuel ratio when the air-fuel ratio detected by the downstream side air-fuel ratio sensor 41 reaches a rich judged air-fuel ratio richer than the stoichiometric air-fuel ratio. Further, after setting the target air-fuel ratio to the lean set air-fuel ratio, the air-fuel ratio control unit switches the target air-fuel ratio from the lean set air-fuel ratio to the rich set air-fuel ratio when the air-fuel ratio detected by the downstream side air-fuel ratio sensor 41 reaches a lean judged air-fuel ratio leaner than the stoichiometric air-fuel ratio. The rich judged air-fuel ratio is an air-fuel ratio determined in advance and, for example, is set to 14.55. Further, the lean judged air-fuel ratio is an air-fuel ratio determined in advance and, for example, is made 14.65.

In the internal combustion engine in the third embodiment, after the target air-fuel ratio is switched to the lean set air-fuel ratio, the oxygen storage amount calculating unit calculates the oxygen storage amount stored in the exhaust purification catalyst 20 in the time period from when the air-fuel ratio detected by the upstream side air-fuel ratio sensor 40 becomes the stoichiometric air-fuel ratio or more to when the air-fuel ratio detected by the downstream side air-fuel ratio sensor 41 becomes the lean side reference air-fuel ratio or more. In other words, after the target air-fuel ratio is switched to the lean set air-fuel ratio, the oxygen storage amount calculating unit cumulatively adds the oxygen excess/deficiency in the time period from when the air-fuel ratio detected by the upstream side air-fuel ratio sensor 40 becomes the stoichiometric air-fuel ratio or more to when the air-fuel ratio detected by the downstream side air-fuel ratio sensor 41 becomes the lean side reference air-fuel ratio or more. The lean side reference air-fuel ratio is determined in advance and is made a value leaner than the stoichiometric air-fuel ratio and richer than the lean judged air-fuel ratio. Note that, the above calculated oxygen storage amount corresponds to the first maximum oxygen storage amount OSAmax1 shown in FIG. 6 to FIG. 8.

Further, after the target air-fuel ratio is switched to the rich set air-fuel ratio, the oxygen storage amount calculating unit calculates the oxygen release amount of oxygen released from the exhaust purification catalyst 20 in the time period from when the air-fuel ratio detected by the upstream side air-fuel ratio sensor 40 becomes the stoichiometric air-fuel ratio or less to when the air-fuel ratio detected by the downstream side air-fuel ratio sensor 41 becomes the rich side reference air-fuel ratio or less. In other words, after the target air-fuel ratio is switched to the rich set air-fuel ratio, the oxygen storage amount calculating unit cumulative adds the absolute value of the oxygen excess/deficiency in the period from when the air-fuel ratio detected by the upstream side air-fuel ratio sensor 40 becomes the stoichiometric air-fuel ratio or less to when the air-fuel ratio detected by the downstream side air-fuel ratio sensor 41 becomes the rich side reference air-fuel ratio or less. The rich side reference air-fuel ratio is determined in advance and is made a value richer than the stoichiometric air-fuel ratio and leaner than the rich judged air-fuel ratio. Further, the oxygen storage amount calculating unit calculates the maximum oxygen storage amount in the same way as the first embodiment or second embodiment.

The internal combustion engine in the third embodiment comprises a sensor abnormality judging unit for judging if the downstream side air-fuel ratio sensor 41 is abnormal. In the present embodiment, the ECU 31 functions as a sensor abnormality judging unit. As will be understood from FIG. 7 and FIG. 8, if the response characteristic of the downstream side air-fuel ratio sensor 41 is abnormal, the difference between the oxygen storage amount (first maximum oxygen storage amount OSAmax1 at FIG. 7 and FIG. 8) and the maximum oxygen storage amount (second maximum oxygen storage amount OSAmax2 of FIG. 7 and FIG. 8) calculated by the oxygen storage amount calculating unit becomes larger. Further, the oxygen release amount calculated by the oxygen storage amount calculating unit becomes substantially equal to the oxygen storage amount, so if the response characteristic of the downstream side air-fuel ratio sensor 41 is abnormal, the difference between the oxygen release amount and maximum oxygen storage amount calculated by the oxygen storage amount calculating unit also becomes larger.

For this reason, the sensor abnormality judging unit judges that the response characteristic of the downstream side air-fuel ratio sensor 41 is abnormal if the difference of the oxygen storage amount or oxygen release amount calculated by the oxygen storage amount calculating unit and the maximum oxygen storage amount calculated by the oxygen storage amount calculating unit is larger than a predetermined reference amount. On the other hand, if the difference of the oxygen storage amount or oxygen release amount calculated by the oxygen storage amount calculating unit and the maximum oxygen storage amount calculated by the oxygen storage amount calculating unit is a predetermined reference amount or less, the sensor abnormality judging unit judges that the response characteristic of the downstream side air-fuel ratio sensor 41 is not abnormal, that is, the response characteristic of the downstream side air-fuel ratio sensor 41 is normal. Due to this, in the third embodiment, the downstream side air-fuel ratio sensor 41 can be diagnosed precisely for abnormality of the response characteristic.

<Control Routine of Abnormality Diagnosis>

Figure 16:
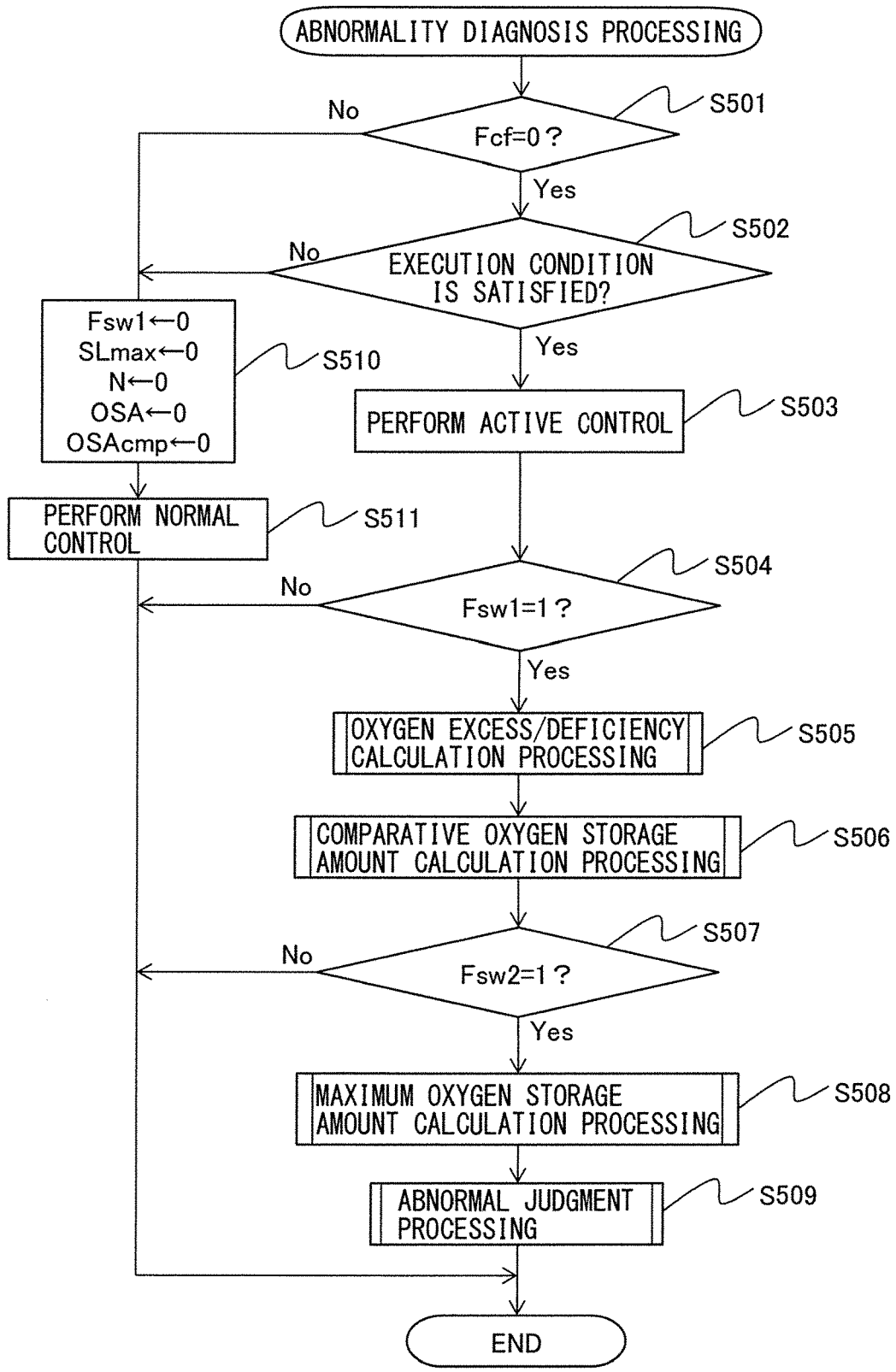
FIG. 16 is a flow chart showing a control routine of abnormality diagnosis processing of an exhaust purification catalyst and downstream side air-fuel ratio sensor.
Figure 17:
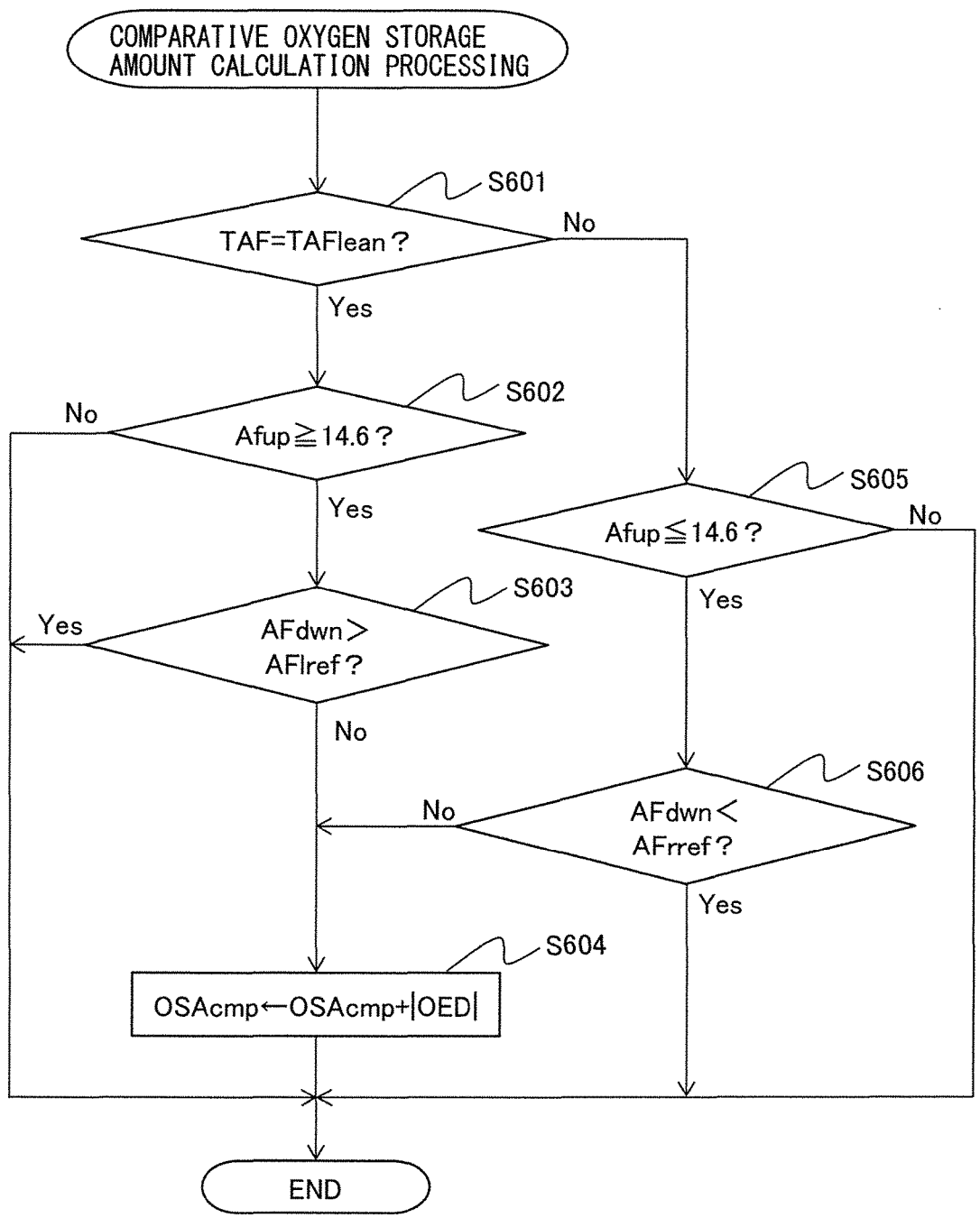
FIG. 17 is a flow chart showing a control routine of comparative oxygen storage amount calculation processing.

Below, referring to the flow chart of FIG. 16 to FIG. 18, the abnormality diagnosis of the exhaust purification catalyst 20 and downstream side air-fuel ratio sensor 41 in the third embodiment will be explained in detail. FIG. 16 is a flow chart of the control routine of the abnormality diagnosis processing of the exhaust purification catalyst 20 and downstream side air-fuel ratio sensor 41. The illustrated control routine is performed by interruption every certain time interval. Step S501 to step S505, step S507, step S508, and step S511 at FIG. 16 are similar to step S101 to step S105, step S106, step S107, and step S110 at FIG. 9, so explanations will be omitted.

In the present control routine, at step S506 after step S505, comparative oxygen storage amount calculation processing is performed. Further, at step S510, the first target air-fuel ratio switching flag Fsw1, maximum value SLmax of the output slope, buffering number N, oxygen storage amount OSA, and comparative oxygen storage amount OSAcmp are reset and made zero. Note that, the comparative oxygen storage amount OSAcmp is a parameter calculated in the later explained comparative oxygen storage amount calculation processing.

<Control Routine of Comparative Oxygen Storage Amount Calculation Processing>

Below, referring to the flow chart of FIG. 17, the comparative oxygen storage amount calculation processing at step S506 of FIG. 16 will be explained. FIG. 17 is a flow chart showing a control routine of comparative oxygen storage amount calculation processing. In the control routine of the comparative oxygen storage amount calculation processing, the comparative oxygen storage amount OSAcmp is calculated in the lean control or rich control in active control.

First, at step S601, it is judged if the target air-fuel ratio TAF of the inflowing exhaust gas is the lean set air-fuel ratio TAFlean. If it is judged that the target air-fuel ratio TAF is the lean set air-fuel ratio TAFlean, that is, if lean control is being performed in the active control, the routine proceeds to step S602.

At step S602, it is judged if the upstream side output air-fuel ratio AFup is the stoichiometric air-fuel ratio (14.6) or more. If it is judged that the upstream side output air-fuel ratio AFup is the stoichiometric air-fuel ratio or more, the routine proceeds to step S603. On the other hand, if it is judged that the upstream side output air-fuel ratio AFup is less than the stoichiometric air-fuel ratio, the present control routine is ended.

At step S603, it is judged if the downstream side output air-fuel ratio AFdwn is larger than the lean side reference air-fuel ratio AFlref. If it is judged that the downstream side output air-fuel ratio AFdwn is the lean side reference air-fuel ratio AFlref or less, the routine proceeds to step S604. At step S604, the value of the comparative oxygen storage amount OSAcmp plus the absolute value of the oxygen excess/deficiency OED is made the new comparative oxygen storage amount OSAcmp. Therefore, the comparative oxygen storage amount OSAcmp is updated. The oxygen excess/deficiency OED is a value calculated at step S207 in FIG. 10. After step S604, the present control routine is ended.

On the other hand, if at step S603 it is judged that the downstream side output air-fuel ratio AFdwn is larger than the lean side reference air-fuel ratio AFlref, the present control routine is ended without updating the comparative oxygen storage amount OSAcmp. If the present control routine is repeatedly performed from when the target air-fuel ratio TAF is switched to the lean set air-fuel ratio TAFlean to when it is switched to the rich set air-fuel ratio TAFrich, the oxygen excess/deficiency cumulatively added in the time period from when the upstream side output air-fuel ratio AFup becomes the stoichiometric air-fuel ratio or more to when the downstream side output air-fuel ratio AFdwn becomes the lean side reference air-fuel ratio or more AFlref or more is calculated as the comparative oxygen storage amount OSAcmp. In this case, the comparative oxygen storage amount OSAcmp corresponds to the oxygen storage amount stored in the exhaust purification catalyst 20 in the period after the target air-fuel ratio TAF is switched to the lean set air-fuel ratio TAFlean from when the upstream side output air-fuel ratio AFup becomes the stoichiometric air-fuel ratio or more to when the downstream side air-fuel ratio output air-fuel ratio AFdwn becomes the lean side reference air-fuel ratio AFlref or more.

On the other hand, if at step S601 it is judged that the target air-fuel ratio TAF is the rich set air-fuel ratio TAFrich, that is, if rich control is being performed in active control, the routine proceeds to step S605.

At step S605, it is judged if the upstream side output air-fuel ratio AFup is the stoichiometric air-fuel ratio (14.6) or less. If it is judged that the upstream side output air-fuel ratio AFup is the stoichiometric air-fuel ratio or less, the routine proceeds to step S606. On the other hand, if it is judged that the upstream side output air-fuel ratio AFup is larger than the stoichiometric air-fuel ratio, the present control routine is ended.

At step S606, it is judged if the downstream side output air-fuel ratio AFdwn is smaller than the rich side reference air-fuel ratio AFrref. If it is judged that the downstream side output air-fuel ratio AFdwn is the rich side reference air-fuel ratio AFrref or more, the routine proceeds to step S604. At step S604, the value of the comparative oxygen storage amount OSAcmp plus the absolute value of the oxygen excess/deficiency OED is made the new comparative oxygen storage amount OSAcmp. Therefore, the comparative oxygen storage amount OSAcmp is updated. The oxygen excess/deficiency OED is the value calculated at step S207 in FIG. 10. After step S604, the present control routine is ended.

On the other hand, if at step S606 it is judged that the downstream side output air-fuel ratio AFdwn is smaller than the rich side reference air-fuel ratio AFrref, the present control routine is ended without updating the comparative oxygen storage amount OSAcmp. If the present control routine is repeatedly performed from when the target air-fuel ratio TAF is switched to the rich set air-fuel ratio TAFrich to when it is switched to the lean set air-fuel ratio TAFlean, the oxygen excess/deficiency cumulatively added in the time period from when the upstream side output air-fuel ratio AFup becomes the stoichiometric air-fuel ratio or less to when the downstream side output air-fuel ratio AFdwn becomes the rich side reference air-fuel ratio AFrref or less is calculated as the comparative oxygen storage amount OSAcmp. In this case, the comparative oxygen storage amount OSAcmp corresponds to the oxygen release amount of oxygen released from the exhaust purification catalyst 20 in the period after the target air-fuel ratio TAF is switched to the rich set air-fuel ratio TAFlean from when the upstream side output air-fuel ratio AFup becomes the stoichiometric air-fuel ratio or less to when the downstream side air-fuel ratio output air-fuel ratio AFdwn becomes the rich side reference air-fuel ratio AFrref or more.

<Control Routine of Abnormality Judgment Processing>

Figure 18:
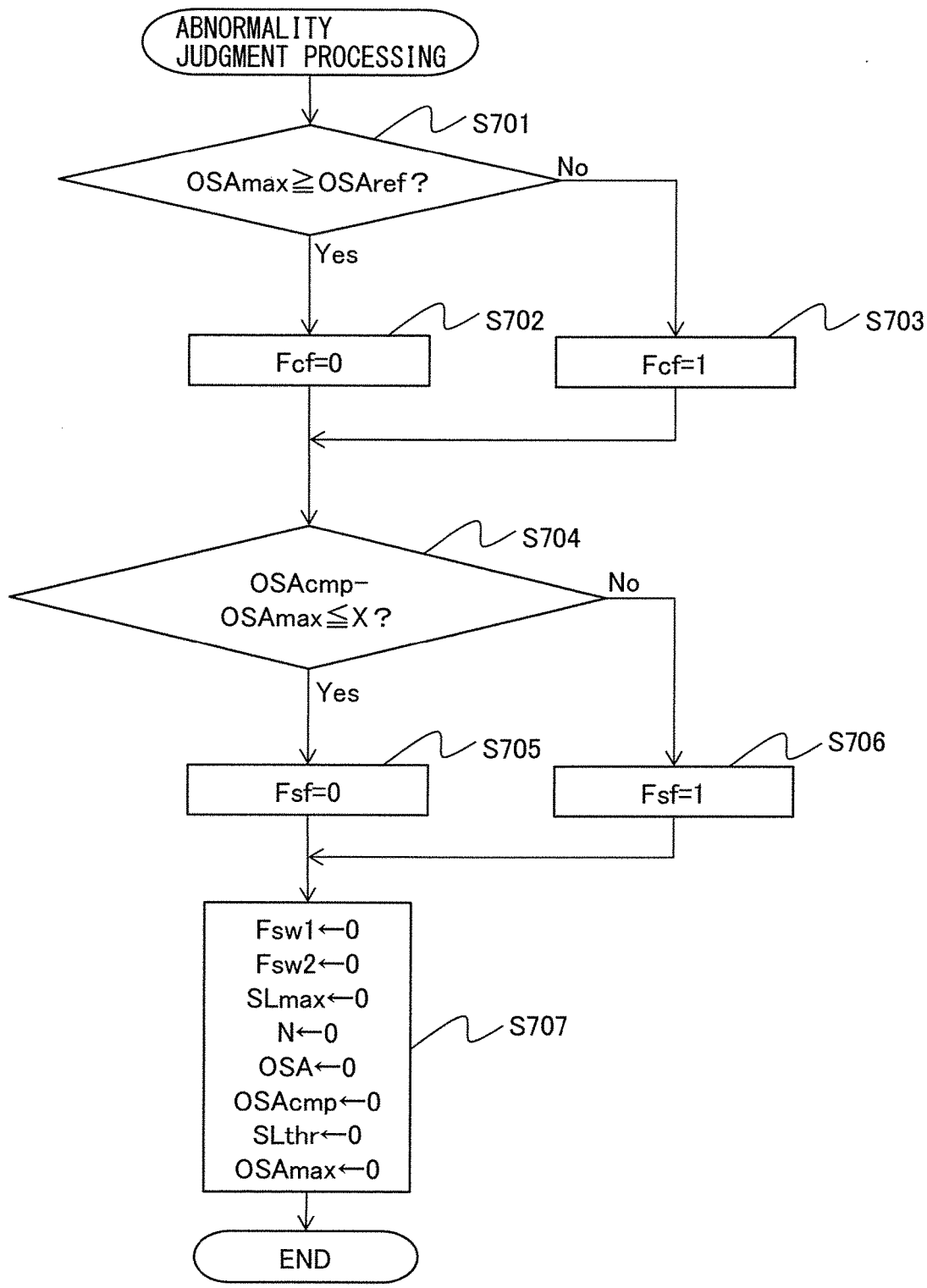
FIG. 18 is a flow chart showing a control routine of abnormality judgment processing.

In abnormality judgment processing of step S509 of FIG. 16, the control routine shown in FIG. 18 is performed. FIG. 18 is a flow chart showing the control routine of abnormality judgment processing. In the control routine of abnormality judgment processing, it is judged if not only the exhaust purification catalyst 20, but also the downstream side air-fuel ratio sensor 41 is abnormal. Step S701 to step S703 at FIG. 18 are similar to step S401 to step S403 at FIG. 12, so the explanations will be omitted.

In the present control routine, after step S702 or step S703, the routine proceeds to step S704. At step S704, it is judged if the value of the comparative oxygen storage amount OSAcmp minus the maximum oxygen storage amount OSAmax is the reference amount X or less. The comparative oxygen storage amount OSAcmp is a value calculated at step S604 of FIG. 17. The maximum oxygen storage amount OSAmax is a value calculated at step S305 or step S306 of FIG. 11 or step S908 or step S909 of FIG. 15. Further, the reference amount X is determined in advance and is made the upper limit value of the difference between the comparative oxygen storage amount OSAcmp and the maximum oxygen storage amount OSAmax which may occur when the response characteristic of the downstream side air-fuel ratio sensor 41 is normal. The reference amount X may also be zero.

If at step S704 it is judged that the value of the comparative oxygen storage amount OSAcmp minus the maximum oxygen storage amount OSAmax is the reference amount X or less, the routine proceeds to step S705. At step S705, it is judged that the response characteristic of the downstream side air-fuel ratio sensor 41 is not abnormal, then the sensor abnormality judgment flag Fsf is made zero. On the other hand, if at step S704 it is judged that the value of the comparative oxygen storage amount OSAcmp minus the maximum oxygen storage amount OSAmax is larger than the reference amount X, the routine proceeds to step S706. At step S706, it is judged that the response characteristic of the downstream side air-fuel ratio sensor 41 is abnormal, then the sensor abnormality judgment flag Fsf is made "1".

After step S705 or step S706, the routine proceeds to step S707. At step S707, the first target air-fuel ratio switching flag Fsw1, second target air-fuel ratio switching flag Fsw2, maximum value SLmax of the output slope, buffering number N, oxygen storage amount OSA, comparative oxygen storage amount OSAcmp, threshold value SLthr, and maximum oxygen storage amount OSAmax are reset and made zero. After step S707, the present control routine is ended.

Note that, the time that the target air-fuel ratio TAF is switched in active control may be made the starting point of the cumulative addition of the oxygen excess/deficiency OED for calculating the maximum oxygen storage amount OSAmax and comparative oxygen storage amount OSAcmp. In this case, step S201, step S202, and step S210 in FIG. 10 and step S602 and step S605 in FIG. 17 are omitted. Further, the maximum oxygen storage amount OSAmax and comparative oxygen storage amount OSAcmp may be calculated a plurality of times, and at step S704 in FIG. 18, it may be judged if the value of the average value of the plurality of comparative oxygen storage amounts OSAcmp minus the average value of the plurality of maximum oxygen storage amounts OSAmax is the reference amount X or less.

Note that, all of the control routines explained above are performed by the ECU 31 of the internal combustion engine.

Above, preferred embodiments according to the present disclosure were explained, but the present disclosure is not limited to these embodiments and may be modified and changed in various ways within the scope of the claims. For example, in the above-mentioned embodiments, as the downstream side sensor arranged at the downstream side of the exhaust purification catalyst in the direction of flow of exhaust, an air-fuel ratio sensor is used, but the downstream side sensor may also be an oxygen sensor.

REFERENCE SIGNS LIST 1. engine body
5. combustion chamber
6. intake valve
7. intake port
8. exhaust valve
9. exhaust port 11. fuel injector
19. exhaust manifold
20. exhaust purification catalyst
31. ECU
39. air flow meter
40. upstream side air-fuel ratio sensor
41. downstream side air-fuel ratio sensor

The invention claimed is:

1. An internal combustion engine comprising:
an exhaust purification catalyst arranged in an exhaust passage and able to store oxygen,
a downstream side sensor arranged at a downstream side of the exhaust purification catalyst in a direction of flow of exhaust and detecting an air-fuel ratio of outflowing exhaust gas flowing out from the exhaust purification catalyst,
an air-fuel ratio control unit for alternately switching a target air-fuel ratio of inflowing exhaust gas flowing into the exhaust purification catalyst between a rich set air-fuel ratio richer than a stoichiometric air-fuel ratio and a lean set air-fuel ratio leaner than the stoichiometric air-fuel ratio based on an output of the downstream side sensor, and
an oxygen storage amount calculating unit for calculating an oxygen excess/deficiency of the inflowing exhaust gas with respect to the stoichiometric air-fuel ratio in a time period of at least part of an air-fuel ratio maintenance time period in which the target air-fuel ratio is maintained at either air-fuel ratio of the rich set air-fuel ratio and the lean set air-fuel ratio and cumulatively adding the calculated oxygen excess/deficiency to calculate a maximum oxygen storage amount of the exhaust purification catalyst,
wherein the oxygen storage amount calculating unit uses a point of time that an absolute value of an output slope of the downstream side sensor finally becomes less than a threshold value in the air-fuel ratio maintenance time period as an end point of cumulative addition of the oxygen excess/deficiency, and
the threshold value is made larger when a maximum value of the absolute value of the output slope in the air-fuel ratio maintenance time period is relatively large compared to when the maximum value is relatively small.

2. The internal combustion engine according to claim 1, wherein the downstream side sensor is an air-fuel ratio sensor linearly detecting an air-fuel ratio of the outflowing exhaust gas.

3. The internal combustion engine according to claim 2, wherein
the internal combustion engine further comprises a catalyst temperature estimating unit for estimating a temperature of the exhaust purification catalyst,
the oxygen storage amount calculating unit calculates the oxygen excess/deficiency of the inflowing exhaust gas with respect to the stoichiometric air-fuel ratio in a time period of at least part of an air-fuel ratio maintenance time period in which the target air-fuel ratio is maintained at the lean set air-fuel ratio and cumulatively adds the calculated oxygen excess/deficiency to calculate a maximum oxygen storage amount of the exhaust purification catalyst, and
the threshold value is corrected based on a temperature of the exhaust purification catalyst in the air-fuel ratio maintenance time period.

4. The internal combustion engine according to claim 1, wherein
the internal combustion engine further comprises an upstream side air-fuel ratio sensor arranged at an upstream side of the exhaust purification catalyst in the direction of flow of exhaust and linearly detecting an air-fuel ratio of the inflowing exhaust gas, and
the oxygen storage amount calculating unit calculates the oxygen excess/deficiency based on the output of the upstream side air-fuel ratio sensor.

5. The internal combustion engine according to claim 4, wherein the oxygen storage amount calculating unit uses a time that the air-fuel ratio detected by the upstream side air-fuel ratio sensor in the air-fuel ratio maintenance time period reaches the stoichiometric air-fuel ratio as a starting point of cumulative addition of the oxygen excess/deficiency.

6. The internal combustion engine according to claim 1, wherein the oxygen storage amount calculating unit uses a time that the target air-fuel ratio is switched to either of the rich set air-fuel ratio or the lean set air-fuel ratio in the air-fuel ratio maintenance time period as a starting point of cumulative addition of the oxygen excess/deficiency.

7. The internal combustion engine according to claim 1, wherein
the internal combustion engine further comprises a catalyst abnormality judging unit for judging if the exhaust purification catalyst is abnormal, and
the catalyst abnormality judging unit judges that the exhaust purification catalyst is abnormal when the maximum oxygen storage amount is smaller than a predetermined reference oxygen storage amount.

8. The internal combustion engine according to claim 5, wherein the internal combustion engine further comprises a sensor abnormality judging unit for judging if the downstream side sensor is abnormal, after the target air-fuel ratio is switched to the lean set air-fuel ratio, the oxygen storage amount calculating unit calculates an oxygen storage amount stored in the exhaust purification catalyst in the period from when the air-fuel ratio detected by the upstream side air-fuel ratio sensor becomes the stoichiometric air-fuel ratio or more to when the air-fuel ratio detected by the downstream side sensor becomes a predetermined air-fuel ratio leaner than the stoichiometric air-fuel ratio or more, and the sensor abnormality judging unit judges that the downstream side sensor is abnormal when a difference between the oxygen storage amount and the maximum oxygen storage amount is larger than a predetermined first reference amount.

9. The internal combustion engine according to claim 5, wherein the internal combustion engine further comprises a sensor abnormality judging unit for judging if the downstream side sensor is abnormal, after the target air-fuel ratio is switched to the rich set air-fuel ratio, the oxygen storage amount calculating unit calculates an oxygen release amount of oxygen released from the exhaust purification catalyst in the period from when the air-fuel ratio detected by the upstream side air-fuel ratio sensor becomes the stoichiometric air-fuel ratio or less to when the air-fuel ratio detected by the downstream side sensor becomes a predetermined air-fuel ratio richer than the stoichiometric air-fuel ratio or less, and the sensor abnormality judging unit judges that the downstream side sensor is abnormal when a difference between the oxygen release amount and the maximum oxygen storage amount is larger than a predetermined first reference amount.

10. The internal combustion engine according to claim 6, wherein the internal combustion engine further comprises a sensor abnormality judging unit for judging if the downstream side sensor is abnormal, the oxygen storage amount calculating unit calculates an oxygen storage amount stored in the exhaust purification catalyst in the period from when the target air-fuel ratio is switched to the lean set air-fuel ratio to when the air-fuel ratio detected by the downstream side air-fuel ratio sensor becomes a predetermined value leaner than the stoichiometric air-fuel ratio or more, and the sensor abnormality judging unit judges that the downstream side sensor is abnormal when a difference between the oxygen storage amount and the maximum oxygen storage amount is larger than a predetermined second reference amount.

11. The internal combustion engine according to claim 6, wherein the internal combustion engine further comprises a sensor abnormality judging unit for judging if the downstream side sensor is abnormal, the oxygen storage amount calculating unit calculates an oxygen release amount of oxygen released from the exhaust purification catalyst in the period from when the target air-fuel ratio is switched to the rich set air-fuel ratio to when the air-fuel ratio detected by the downstream side air-fuel ratio sensor becomes a predetermined value richer than the stoichiometric air-fuel ratio or less, and the sensor abnormality judging unit judges that the downstream side sensor is abnormal when a difference between the oxygen release amount and the maximum oxygen storage amount is larger than a predetermined second reference amount.

* * * * *